US 7,627,588 B1

(12) United States Patent
Mohan et al.

(10) Patent No.: US 7,627,588 B1
(45) Date of Patent: Dec. 1, 2009

(54) SYSTEM AND METHOD FOR CONCEPT BASED ANALYSIS OF UNSTRUCTURED DATA

(75) Inventors: Rengaswamy Mohan, Jacksonville, FL (US); Usha Mohan, Jacksonville, FL (US); David D. Sha, Jacksonville, FL (US)

(73) Assignee: Ixreveal, Inc., Jacksonville, FL (US)

( * ) Notice: Subject to any disclaimer, the term of this patent is extended or adjusted under 35 U.S.C. 154(b) by 265 days.

(21) Appl. No.: 10/677,492

(22) Filed: Oct. 3, 2003

Related U.S. Application Data

(63) Continuation-in-part of application No. 10/393,677, filed on Mar. 19, 2003, and a continuation-in-part of application No. 10/087,053, filed on Mar. 1, 2002, now Pat. No. 6,970,881.

(60) Provisional application No. 60/366,045, filed on Mar. 19, 2002, provisional application No. 60/302,971, filed on May 7, 2001.

(51) Int. Cl.
*G06F 17/30* (2006.01)

(52) U.S. Cl. .............................. 707/101; 707/3; 707/4; 707/5; 707/6; 707/100

(58) Field of Classification Search .................. 707/5, 707/102; 704/9; 702/66; 703/22
See application file for complete search history.

(56) References Cited

U.S. PATENT DOCUMENTS

| 4,839,853 A | 6/1989 | Deerwester et al. |
|---|---|---|
| 5,278,980 A | 1/1994 | Pedersen et al. |
| 5,295,256 A | 3/1994 | Bapat |
| 5,418,951 A | 5/1995 | Damashek |
| 5,488,725 A | 1/1996 | Turtle et al. |
| 5,519,865 A | 5/1996 | Kondo et al. |
| 5,555,408 A | 9/1996 | Fujisawa et al. |
| 5,592,667 A | 1/1997 | Bugajski |
| 5,617,578 A | 4/1997 | Kroll et al. |
| 5,619,709 A | 4/1997 | Caid et al. |
| 5,634,051 A | 5/1997 | Thomson |
| 5,727,950 A | 3/1998 | Cook et al. |
| 5,761,496 A | 6/1998 | Hattori |
| 5,768,578 A | 6/1998 | Kirk et al. |
| 5,794,178 A | 8/1998 | Caid et al. |
| 5,819,260 A | 10/1998 | Lu et al. |
| 5,832,182 A | 11/1998 | Zhang et al. |
| 5,832,470 A | 11/1998 | Morita et al. |
| 5,867,799 A | 2/1999 | Lang et al. |
| 5,884,305 A | 3/1999 | Kleinberg et al. |

(Continued)

OTHER PUBLICATIONS

Arents, H.C. et al., "Concept-Based Retrieval of Hypermedia Information: From Term Indexing to Semantic Hyperindexing," *Information Processing & Management*, vol. 29, No. 3, pp. 373-386, May-Jun. 1993.

(Continued)

*Primary Examiner*—Khanh B Pham
(74) *Attorney, Agent, or Firm*—Cooley Godward Kronish LLP

(57) ABSTRACT

A computer implemented system and method automates analysis and mining of concepts from unstructured data. At least one concept within at least one object is analyzed. Analysis involves: selecting an object for inclusion in an initial set of objects to be analyzed; using an algorithm to extract a concept from the initial set of objects to create an initial set of concepts; refining the concept based upon relationships to other concepts; and performing multi-dimensional analysis on the concept in the initial set of objects to analyze the concept.

34 Claims, 25 Drawing Sheets

U.S. PATENT DOCUMENTS

| | | | |
|---|---|---|---|
| 5,920,864 A | 7/1999 | Zhao |
| 5,924,090 A | 7/1999 | Krellenstein |
| 5,926,811 A | 7/1999 | Miller et al. |
| 5,933,822 A | 8/1999 | Braden-Harder et al. |
| 5,963,940 A * | 10/1999 | Liddy et al. | 707/5 |
| 5,983,214 A | 11/1999 | Lang et al. |
| 5,987,446 A | 11/1999 | Corey et al. |
| 5,987,447 A | 11/1999 | Chang et al. |
| 6,006,221 A | 12/1999 | Liddy et al. |
| 6,026,388 A | 2/2000 | Liddy et al. |
| 6,028,605 A | 2/2000 | Conrad et al. |
| 6,029,161 A | 2/2000 | Lang et al. |
| 6,038,561 A | 3/2000 | Snyder et al. |
| 6,055,526 A | 4/2000 | Ambroziak |
| 6,078,924 A | 6/2000 | Ainsbury et al. |
| 6,101,491 A | 8/2000 | Woods |
| 6,101,492 A | 8/2000 | Jacquemin et al. |
| 6,101,515 A | 8/2000 | Wical et al. |
| 6,122,628 A | 9/2000 | Castelli et al. |
| 6,182,063 B1 | 1/2001 | Woods |
| 6,189,002 B1 | 2/2001 | Roitblat |
| 6,195,657 B1 | 2/2001 | Rucker et al. |
| 6,199,034 B1 | 3/2001 | Wical |
| 6,199,067 B1 | 3/2001 | Geller |
| 6,233,575 B1 | 5/2001 | Agrawal et al. |
| 6,236,987 B1 | 5/2001 | Horowitz et al. |
| 6,256,633 B1 | 7/2001 | Dharap |
| 6,263,335 B1 | 7/2001 | Paik et al. |
| 6,289,382 B1 | 9/2001 | Bowman-Amuah |
| 6,300,957 B1 | 10/2001 | Rao et al. |
| 6,308,175 B1 | 10/2001 | Lang et al. |
| 6,314,420 B1 | 11/2001 | Lang et al. |
| 6,327,593 B1 | 12/2001 | Goiffon |
| 6,330,563 B1 | 12/2001 | Heckerman |
| 6,366,908 B1 | 4/2002 | Chong et al. |
| 6,377,259 B1 | 4/2002 | Tenev et al. |
| 6,385,600 B1 | 5/2002 | McGuinness et al. |
| 6,385,602 B1 | 5/2002 | Tso et al. |
| 6,424,973 B1 | 7/2002 | Baclawski |
| 6,442,545 B1 | 8/2002 | Feldman et al. |
| 6,453,312 B1 | 9/2002 | Goiffon et al. |
| 6,453,339 B1 | 9/2002 | Schultz et al. |
| 6,477,524 B1 | 11/2002 | Taskiran et al. |
| 6,492,989 B1 | 12/2002 | Wilkinson |
| 6,496,818 B1 | 12/2002 | Ponte |
| 6,502,045 B1 * | 12/2002 | Biagiotti | 702/66 |
| 6,510,406 B1 * | 1/2003 | Marchisio | 704/9 |
| 6,513,036 B2 | 1/2003 | Fruensgaard et al. |
| 6,523,028 B1 | 2/2003 | DiDomizio et al. |
| 6,532,469 B1 | 3/2003 | Feldman et al. |
| 6,539,376 B1 | 3/2003 | Sundaresan et al. |
| 6,564,210 B1 | 5/2003 | Korda et al. |
| 6,567,797 B1 | 5/2003 | Schuetze et al. |
| 6,567,804 B1 | 5/2003 | Ramasamy et al. |
| 6,581,068 B1 | 6/2003 | Bensoussan et al. |
| 6,606,659 B1 | 8/2003 | Hegli et al. |
| 6,611,825 B1 | 8/2003 | Billheimer et al. |
| 6,628,312 B1 | 9/2003 | Rao et al. |
| 6,629,095 B1 | 9/2003 | Wagstaff et al. |
| 6,629,097 B1 * | 9/2003 | Keith | 707/5 |
| 6,633,868 B1 | 10/2003 | Min et al. |
| 6,636,848 B1 | 10/2003 | Aridor et al. |
| 6,643,661 B2 | 11/2003 | Polizzi et al. |
| 6,654,761 B2 | 11/2003 | Tenev et al. |
| 6,665,662 B1 | 12/2003 | Kirkwood et al. |
| 6,675,159 B1 | 1/2004 | Lin et al. |
| 6,684,207 B1 | 1/2004 | Greenfield et al. |
| 6,701,305 B1 | 3/2004 | Holt et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,766,316 B2 | 7/2004 | Caudill et al. |
| 6,778,979 B2 | 8/2004 | Grefenstette et al. |
| 6,892,189 B2 | 5/2005 | Quass et al. |
| 6,895,406 B2 | 5/2005 | Fables et al. |
| 6,901,555 B2 | 5/2005 | Hida et al. |
| 6,928,398 B1 | 8/2005 | Fang et al. |
| 6,941,321 B2 | 9/2005 | Schuetze et al. |
| 6,944,626 B2 | 9/2005 | Cameron et al. |
| 6,961,731 B2 | 11/2005 | Holbrook |
| 6,970,860 B1 | 11/2005 | Liu et al. |
| 6,970,881 B1 | 11/2005 | Mohan et al. |
| 6,976,017 B1 | 12/2005 | Getchius |
| 7,007,034 B1 * | 2/2006 | Hartman et al. | 707/102 |
| 7,023,453 B2 | 4/2006 | Wilkinson et al. |
| 7,194,483 B1 | 3/2007 | Mohan et al. |
| 2002/0007373 A1 | 1/2002 | Blair et al. |
| 2002/0016800 A1 * | 2/2002 | Spivak et al. | 707/523 |
| 2002/0069203 A1 | 6/2002 | Dar et al. |
| 2002/0091696 A1 | 7/2002 | Craft et al. |
| 2002/0107844 A1 | 8/2002 | Cha et al. |
| 2002/0120609 A1 | 8/2002 | Lang et al. |
| 2002/0129015 A1 | 9/2002 | Caudill et al. |
| 2003/0014403 A1 | 1/2003 | Chandrasekar et al. |
| 2003/0018659 A1 | 1/2003 | Fuks et al. |
| 2003/0069882 A1 | 4/2003 | Nieswand et al. |
| 2003/0074177 A1 * | 4/2003 | Bowen | 703/22 |
| 2003/0149586 A1 | 8/2003 | Chen et al. |
| 2003/0163454 A1 | 8/2003 | Jacobsen et al. |
| 2003/0187632 A1 | 10/2003 | Menich |
| 2004/0002959 A1 | 1/2004 | Alpert et al. |
| 2004/0019588 A1 | 1/2004 | Doganata et al. |
| 2004/0049478 A1 | 3/2004 | Jasper et al. |
| 2004/0083206 A1 | 4/2004 | Wu et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0199498 A1 | 10/2004 | Kapur et al. |
| 2004/0254916 A1 | 12/2004 | Dettinger et al. |
| 2005/0021290 A1 | 1/2005 | Velipasaoglu |
| 2005/0021357 A1 | 1/2005 | Schuetze et al. |
| 2005/0021512 A1 | 1/2005 | Koenig |
| 2005/0060340 A1 | 3/2005 | Sommerfield |
| 2005/0065967 A1 | 3/2005 | Schuetze et al. |
| 2005/0091197 A1 | 4/2005 | Dettinger |
| 2005/0091198 A1 | 4/2005 | Dettinger |
| 2005/0108256 A1 | 5/2005 | Wakefield et al. |
| 2005/0149496 A1 | 7/2005 | Mukherjee et al. |
| 2005/0154711 A1 | 7/2005 | McConnell |
| 2005/0160080 A1 | 7/2005 | Dawson |
| 2005/0160082 A1 | 7/2005 | Dawson |
| 2005/0193055 A1 | 9/2005 | Angel et al. |
| 2005/0234879 A1 | 10/2005 | Zeng et al. |
| 2005/0246320 A1 | 11/2005 | Benysh et al. |
| 2005/0278323 A1 | 12/2005 | Horvitz et al. |
| 2006/0047649 A1 | 3/2006 | Liang |
| 2006/0106793 A1 | 5/2006 | Liang |
| 2007/0033221 A1 * | 2/2007 | Copperman et al. | 707/103 R |

OTHER PUBLICATIONS

Belew, R.K., "A connectionist approach to conceptual information retrieval," *ICAIL*, pp. 116-126, May 27-29, 1987.

Bhatia, S.K. and Deogun, J.S., "Conceptual Clustering in Information Retrieval," *IEEE Trans. On Systems, Man, and Cybernetics-Part B*, vol. 28, No. 3, pp. 427-436, Jun. 1998.

Crouch, C. and Yang, B., "Experiments in Automatic Statistical Thesaurus Construction," *Proc. of the Ffteenth Annual International ACM SIGIR Conference on Research and Development in Information Retrieval*, pp. 77-88, Jun. 21-24, 1992.

Deerwester, S. et al., "Indexing by Latent Semantic Analysis," *Journal of the American Society for Information Science*, vol. 41, No. 6, pp. 391-407, Sep. 1990.

Dumais, S. et al., "Inductive Learning Algorithms and Representations For Text Categorization," *Proc. of the Seventh International Conference On Information And Knowledge Management*, pp. 148-155, ACM Press, 1998.

Dumais, S. et al., "Optimizing Search by Showing Results In Context," *SIGHCHI'01*, vol. 3, No. 1, pp. 277-284, Mar. 31-Apr. 5, 2001.

Fagan, J. L., "Automatic Phrase Indexing for Document Retrieval," *Proc. of the Tenth Annual International ACM SIGIR Conference on Research and Development in Information Retrieval*, pp. 91-101, Jun. 3-5, 1987.

Feldman, R., "Tutorial 4. Mining Unstructured Data", *KDD-99 Tutorial Notes*, pp. 182-236, ACM Press, 1999.

Finkelstein, L. et al., "Placing Search in Context: The Concept Revisited," *Tenth International Conference on World Wide Web*, pp. 406-414, May 1-5, 2001.

Giger, H.P., "Concept Based Retrieval in Classical IR Systems", *Proc. of the Eleventh Annual International ACM SIGIR Conference on Research and Development in Information Retrieval*, pp. 275-289, May 1998.

Haveliwala, T.H., "Topic-Sensitive PageRanik," *Eleventh International World Wide Web Conference*, pp. 517-526, May 7-11, 2002.

Jain, A.K. et al. "Data Clustering: A Review", *ACM Computing Surveys*, vol. 31, No. 3, pp. 264-323, Sep. 1999.

Jang, H. W .Park, S.Y., "Keyfact Concept for an Information Retrieval System," *Proc. of Natural Language Processing Pacific Rim Symposium*, pp. 510-513, Dec. 4-7, 1995.

Jun, M.S. and Park, S.Y., "Keyfact-Based Information Retrieval System," *International Symposium on Digital Library*, pp. 521-524, 1997.

Kolda, T.G. and O'Leary, D.P., "A Semidiscrete Matrix Decomposition for Latent Semantic Indexing in Information Retrieval," *ACM Transactions on Information Systems*, vol. 16, No. 4, pp. 322-346, Oct. 1998.

Kritzstein, B., "Starlight: Knowledge Management on a Whole New Plane," *Chemical and Biological Defense Info Analysis Center Newsletter*, vol. 5, No. 4, pp. 10-12, Fall 2004.

Lawrence, S., "Context in Web Search," *Bulletin of the Technical Committee on Data Engineering*, IEEE Computer Society, vol. 23, No. 3, pp. 25-32, Sep. 2000.

Leake, D.B. and Scherle, R., "Towards Context-Based Search Engine Selection," *Sixth International Conference on Intelligent User Interfaces*, Santa Fe, New Mexico, pp. 109-112, Jan. 14-17, 2001.

Nigam, K. et al., "Learning to Classify Text From Labeled and Unlabeled Documents," Proc. of AAAI-98, 15th Conference of the American Association for Artificial Intelligence, pp. 792-799, Jul. 26-30, 1998.

Salton, G. et al., "A Vector Space Model for Automatic Indexing," *Communications of the ACM*, vol. 18, No. 11, pp. 613-620, Nov. 1975.

Singh, L. et al., "Generating Association Rules from Semi-Structured Documents Using an Extended Concept Hierarchy," *Proc. of the Sixth International Conference on Information and Knowledge Management*, pp. 193-200, Nov. 10-14, 1997.

Yang, Y. et al. "An Evaluation of Statistical Approaches to Text Categorization," *Information Retrieval*, vol. 1, pp. 69-90, 1999.

Ankerst, et al., "DataJewel" Tightly Integrating Visualization with Temporal Data Mining, ICDM Workshop on Visual Data Mining, Melbourne, FL, Nov. 19-23, 2003.

Boeing Frontiers, "Text Mining for Golden Results," p. 50, Jul. 2005.

Botev et al., "Context-sensitive keyword search and ranking for XML" Eighth International Workshop on the Web and databases, Jun. 16-17, 2005.

Leake et al., "Exploiting rich content: An incremental approach to context-based web search," Proceedings of Fifth International and Interdisciplinary Conference on Modeling and Using Context, Paris, France, vol. 3554, pp. 254-267, Jul. 5-8, 2005.

European Search Report issued in Ep Application No. 06816600.8, 2009-06-15, 6 pgs.

* cited by examiner

SYSTEM AND METHOD FOR CONCEPT BASED ANALYSIS OF UNSTRUCTURED DATA

CROSS-REFERENCE TO RELATED APPLICATIONS

This application is a continuation-in-part of U.S. application Ser. No. 10/087,053, filed Mar. 1, 2002, which claims priority to U.S. Prov. Appl. No. 60/302,971, filed May 7, 2001, and of U.S. application Ser. No. 10/393,677, filed Mar. 19, 2003, which claims priority to U.S. Prov. Appl. No. 60/366,045, filed Mar. 19, 2002, all of which are incorporated herein by reference as if reproduced in full below.

BACKGROUND OF THE INVENTION

1. Field of the Invention

This invention relates generally to the field of data processing and, more particularly, to the automated analysis and mining of concepts from unstructured data.

2. Related Art

Structured data or objects generally refer to data existing in an organized form, such as a relational database, that can be accessed and analyzed by conventional techniques (i.e. Standard Query Language, SQL). By contrast, so-called unstructured data or objects refer to objects in a textual format (i.e. faxes, e-mails, documents, voice converted to text) that do not necessarily share a common organization. Unstructured information often remains hidden and un-leveraged by an organization primarily because it is hard to access the right information at the right time or to integrate, analyze, or compare multiple items of information as a result of their unstructured nature. There exists a need for a system and method to provide structure for unstructured information such that the unstructured objects can be accessed with powerful conventional tools (such as, for example, SQL, or other information query and/or analysis tools) and analyzed for hidden trends and patterns across a corpus of unstructured objects.

Conventional systems and methods for accessing unstructured objects have focused on tactical searches that seek to match keywords. These convention systems and methods have several shortcomings. For example, assume a tactical search engine accepts search text. For purposes of illustration, suppose information about insects is desired and the user-entered search text is 'bug'. The search engine scans available unstructured objects, including individual objects: In this example, one unstructured object concerns the Volkswagen bug, one is about insects at night, one is about creepy-crawlies, one is about software bugs, and one is about garden bugs. The tactical search engine performs keyword matching, looking for the search text to appear in at least one of the unstructured objects. In this 'bug' example, only those objects about the Volkswagen bug, software bugs, and garden bugs actually contain the word 'bug' and will be returned. The objects about insects at night, and creepy-crawlies may have been relevant to the search but unfortunately were not identified by the conventional tactical search engine.

One conventional method of addressing this problem allows a user to enter detailed searches utilizing phrases or Boolean logic, but successful detailed tactical searches can be extremely difficult to formulate. The user must be sophisticated enough to express their search criteria in terms of Boolean logic. Furthermore, the user needs to know precisely what he or she is searching for, in the exact language that they expect to find it. Thus, there is a need for a search mechanism to more easily locate documents or other objects of interest, preferably searching with the user's own vocabulary. Further, such a mechanism should desirably enable automatically searching related words and phrases, without knowledge of advanced searching techniques.

In another conventional method, the search is done based on meaning, where each of the words or phrases typed is semantically analyzed, as if second guessing the user (for example, use of the term Juvenile picks up teenager). This increases the result set and thus makes analysis of search results even more important. Also, this technique can be inadequate and quite inaccurate when the user is looking for a concept like "definition of terrorism" or "definition of knowledge management," where the "concept" of the phrase is more important than the meaning of the individual words in the search term.

Even when tactical searches succeed in searching or finding information, the problem of analyzing unstructured information still remains. Analyzing unstructured information goes beyond the ability to locate information of interest. Analysis of unstructured information would allow a user to identify trends in unstructured objects as well as to quickly identify the meaning of an unstructured object, without first having to read or review the entire document. Thus, there further exists a need to provide a system and methodology for analyzing unstructured information.

Prior art classification systems exist that can organize unstructured objects in a hierarchical manner. However, utilizing these classification systems to locate an object of interest requires knowing what the high-level of interest would be, and following one path of inquiry often precludes looking at other options.

Some prior art technologies store data and information utilizing proprietary methods and/or data structures. This prevents widespread or open access or analysis by keeping objects in a native non-standard proprietary format. Thus, there is a need to store captured information about unstructured objects in an open architecture and preferably in a readily accessible standard storage format.

SUMMARY OF THE INVENTION

This present invention provides a system and method for transforming an initial set of unstructured and/or structured information objects into a knowledge discovery platform where actionable intelligence is elucidated and further discovery is made possible. Generally, the present invention provides the ability to link both structured and unstructured information for analysis in order to define new business rules and methods. The complex interactions of an organization at all levels with internal and external clients may be encapsulated for analysis using the methods of the present invention. The integration of all available information sources and business stakeholders results in a more comprehensive analysis of the information sources available to the organization; thus, enhancing decision making. A stakeholder is an entity that interacts with an organization. Stakeholders include people internal and external to the organization as well as electronic devices interacting with the organization.

The present invention transforms currently available unstructured or structured data into a knowledge discovery platform. For example, an important ingredient in capturing the essential information needs of an organization is ongoing feedback received from multiple stakeholders. The ongoing feedback refines concepts leading to improved analysis and output. The knowledge discovery component reveals information gaps that need to be filled as the organization evolves. These continual completions and refinements at multiple points using unbiased integrated structured and unstructured data analytics to reveal information gaps in the method lead to a positive cycle of enhancements.

More specifically, the present invention provides a system and method for transforming an initial set of unstructured and/or structured information objects into a knowledge discovery platform for actionable intelligence. Furthermore, this knowledge discovery platform provides the architecture for discovering and refining current and novel information by synchronizing information needs with information collection and analysis using integrated unstructured and structured knowledge discovery analytics.

The method of the invention includes identifying an electronic path to at least one object for inclusion in an initial set of objects. This object can be, for example, an electronic file from one or more databases, text, graphic, voice, tactile or taste formats. The method uses at least one application/algorithm to extract at least one concept in these various formats to form the initial set of objects to create an initial set of concepts. Relationships among these concepts may be determined, verified and refined using references such as thesauri, dictionaries or other industry specific references and by then applying standard natural language processing techniques.

A thorough understanding of a current set of initial concepts is derived using multidimensional analysis. This analysis permits all of the stakeholders to define the boundary of their information needs. Furthermore, multidimensional analysis may discover at least one additional concept to create a second set of concepts. The addition of this discovered concept alters the information needs boundary. The multidimensional analysis and discovery process is then repeated until no additional useful concepts either within or outside of the organization can be found. The method optionally deletes concepts based on multidimensional analysis and discovery.

The perpetual, cyclical feedback of multiple stakeholders interacting to refine concepts through multidimensional analysis and discovery redefines the information needs boundary leading to new and relevant information collection (and optional deletion) to converge on a dynamically changing information boundary as the interactions of the various stakeholders evolve within and outside the organization. It is this comprehensive and complete information collection that permits a comprehensive and complete analysis and output to fulfill the information needs of all stakeholders at all levels both within and outside an organization.

Further embodiments, features, and advantages of the present invention, as well as the structure and operation of the various embodiments of the present invention, are described below with reference to the accompanying drawings.

An advantage of the present invention is that it provides a system and method for tracking and optionally reporting the changing presence of words or phrases in a set of documents over time.

Another advantage of the invention is that it provides a system and method that can recognize relevant relationships between words and concepts, and can identify an object under more than one level of interest. The present invention scans objects for words or phrases and determines the presence of certain patterns that suggest the meaning or theme of a document, allowing for more accurate classification and retrieval.

Yet another advantage of the present invention is that it provides a relational database as a storage format, of which many types are known. Storage in a relational database keeps the information readily available for analysis by common tools. Where access protection is desired, various known security measures may be employed, as are known in the art.

The present invention provides a theme or concept-based method and system to analyze, categorize and query unstructured information.

BRIEF DESCRIPTION OF THE FIGURES

These and other features of the invention are more fully described below in the detailed description and accompanying drawings.

FIGS. 11-23 are screen shots of graphical user interfaces utilized by the present invention according to an example embodiment.

DETAILED DESCRIPTION OF THE INVENTION

An embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications such as, but not limited to, financial services, wireless telecommunication services, insurance services, high technology, manufacturing, retail, and consumer products.

Table of Contents

I. Invention Overview

II. Object Types: Structured, Unstructured and Semi-Structured

III. Objects Comprised of Other Objects

IV. Extracting Concepts

V. Refining Concepts

VI. Multi-Dimensional Analysis

VII. Working Example of the Present Invention

VIII. Example Graphical User Interfaces of the Present Invention

IX. Conclusion

I. INVENTION OVERVIEW

Figure 1:
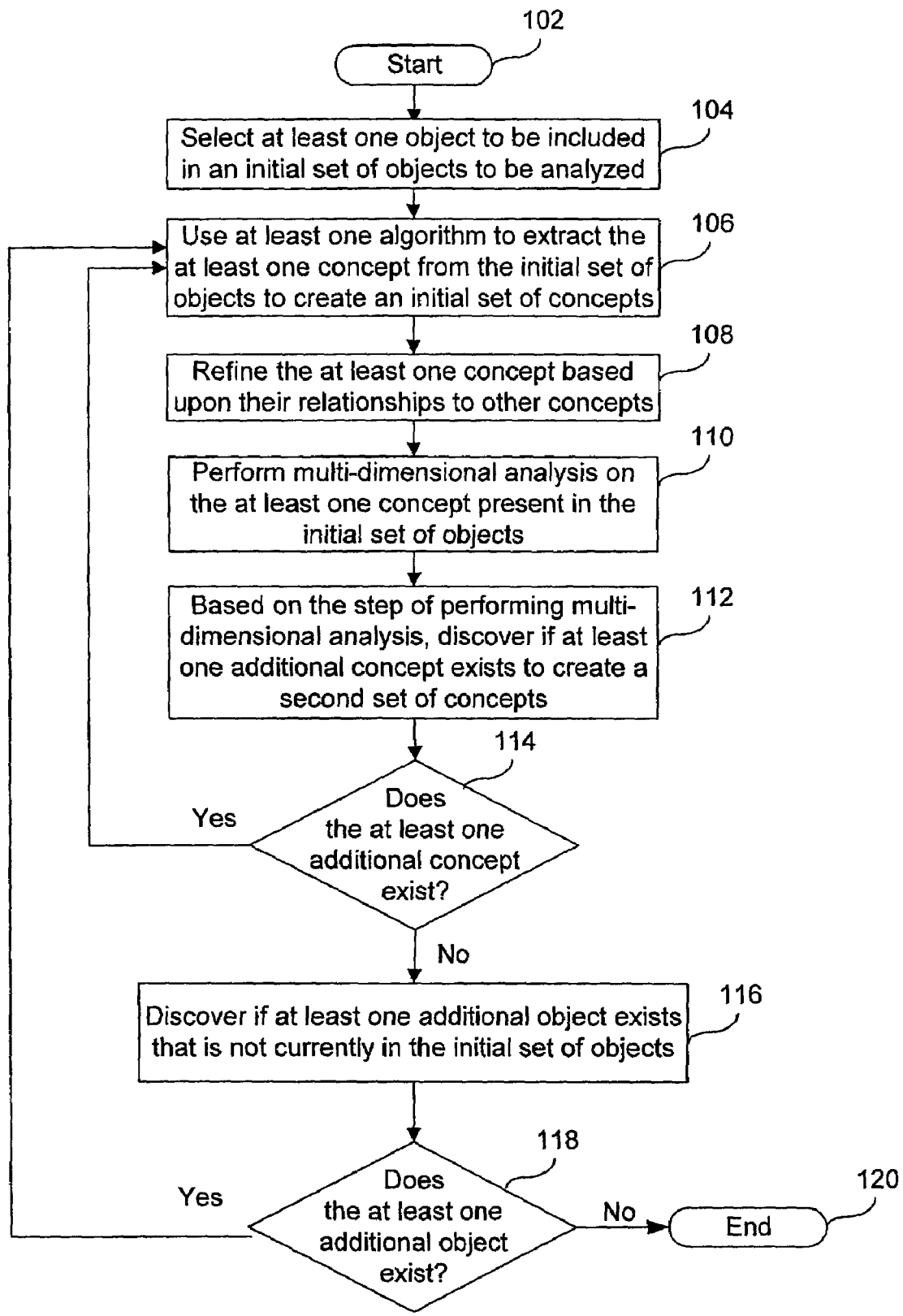
FIG. 1 is a flowchart showing the high level operation of the invention according to an embodiment.

FIG. 1 is a flowchart showing the high level operation of the invention according to an example embodiment. The method starts at step 102 where control transfers to step 104. In step 104, at least one object is selected for inclusion in an initial set of objects to be analyzed. In an embodiment of the invention, an object is a source of information, such as a textual document, an email, a web page, a spreadsheet, or any other container (or containers) of information or concepts that may or may not be formatted. Control then transfers to step 106.

In step 106, at least one application/algorithm is used to extract the at least one concept from the initial set of objects to create an initial set of concepts. Step 106 is further described with reference to FIG. 3 below. Control then passes to step 108. In step 108, the at least one concept is refined based on its relationships to other concepts. Step 108 is further described with reference to FIGS. 4-6 below. Control then passes to step 110.

The terms "application" and "algorithm" are used herein to refer to a method or mathematical algorithm, typically implemented in computer software as a series of logical steps, that performs some function. These functions are generally associated herein with identifying concepts in objects. Example functions include performing speech recognition, identifying features in a graphical image, doing word look-ups in a dictionary or thesaurus, discovering embedded relationships in the words or phrases and the like.

In step 110, multi-dimensional analysis is performed on the at least one concept present in the initial set of objects. Step 110 is further described with reference to FIGS. 7A and 7B below. Control then passes to step 112. In step 112, based on step 110, it is determined (i.e., discovered) whether at least one additional concept exists. Control then passes to step 114. In step 114, if an additional concept exists, then control passes back to step 106 for creation of a second set of concepts. Otherwise, control passes to step 116.

In step 116, it is determined (i.e., discovered) whether at least one additional object exists outside the initial set of objects. Here, a second set of objects will be created that includes the at least one additional object and the objects in the initial set of objects. Control then passes to step 118. In step 118, if one additional object exists then control passes back to step 106. Otherwise, control passes to step 120 where the flowchart in FIG. 1 ends.

Figure 8:
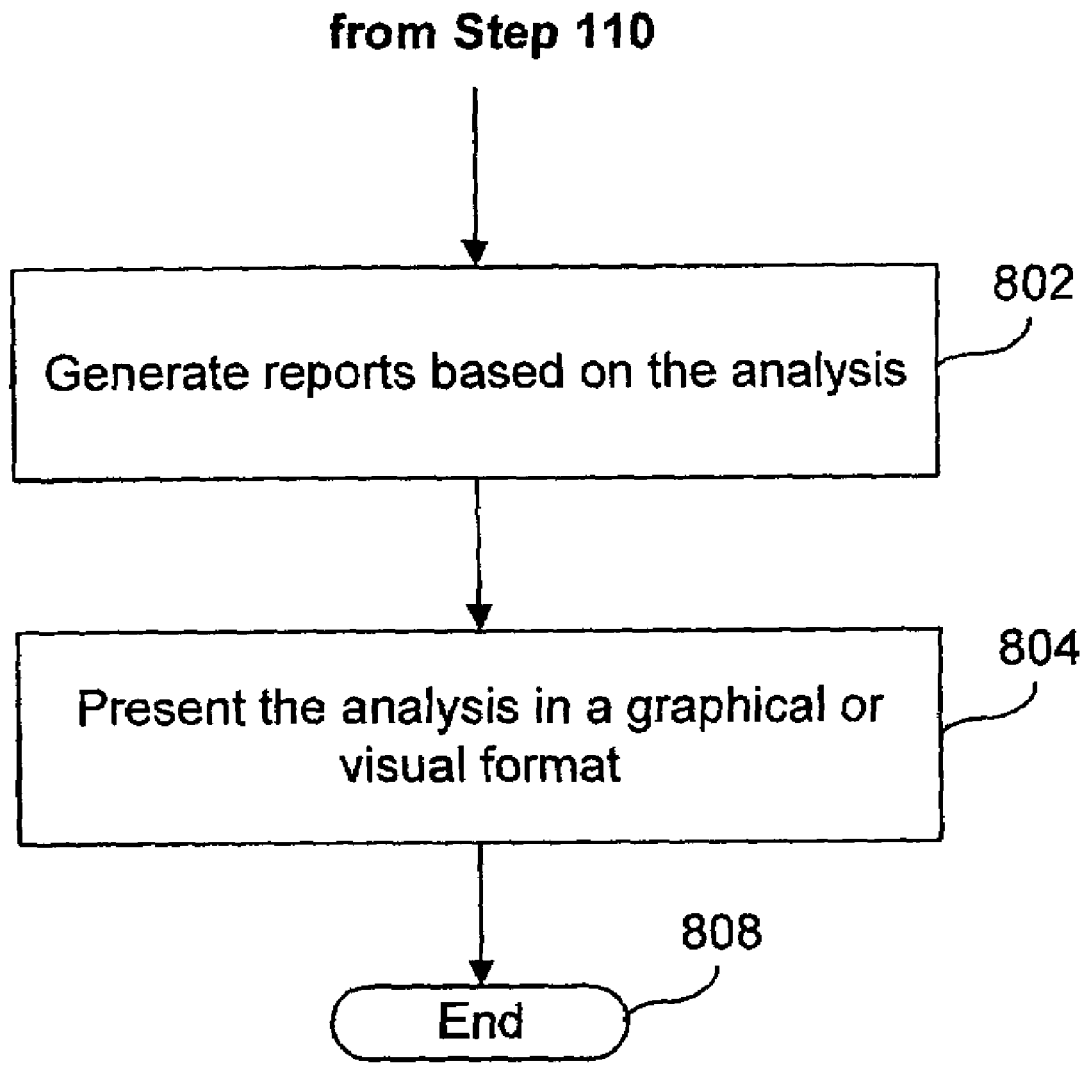
FIG. 8 is a flowchart showing the process of generating reports and presenting analysis according to an embodiment of the present invention.

As described above in step 110 of FIG. 1, multi-dimensional analysis is performed on the at least one concept present in the initial set of objects. FIG. 8 is a flowchart that starts from step 110 and shows the process of generating reports and presenting analysis according to an embodiment of the present invention. As illustrated in FIG. 8, control passes from step 110 to step 802. In step 802, reports are generated based on the multi-dimensional analysis. Control then passes to step 804. In step 804, the analysis is presented in a graphical or visual format. Control then passes to step 808 where the flowchart in FIG. 8 ends.

Figure 9:
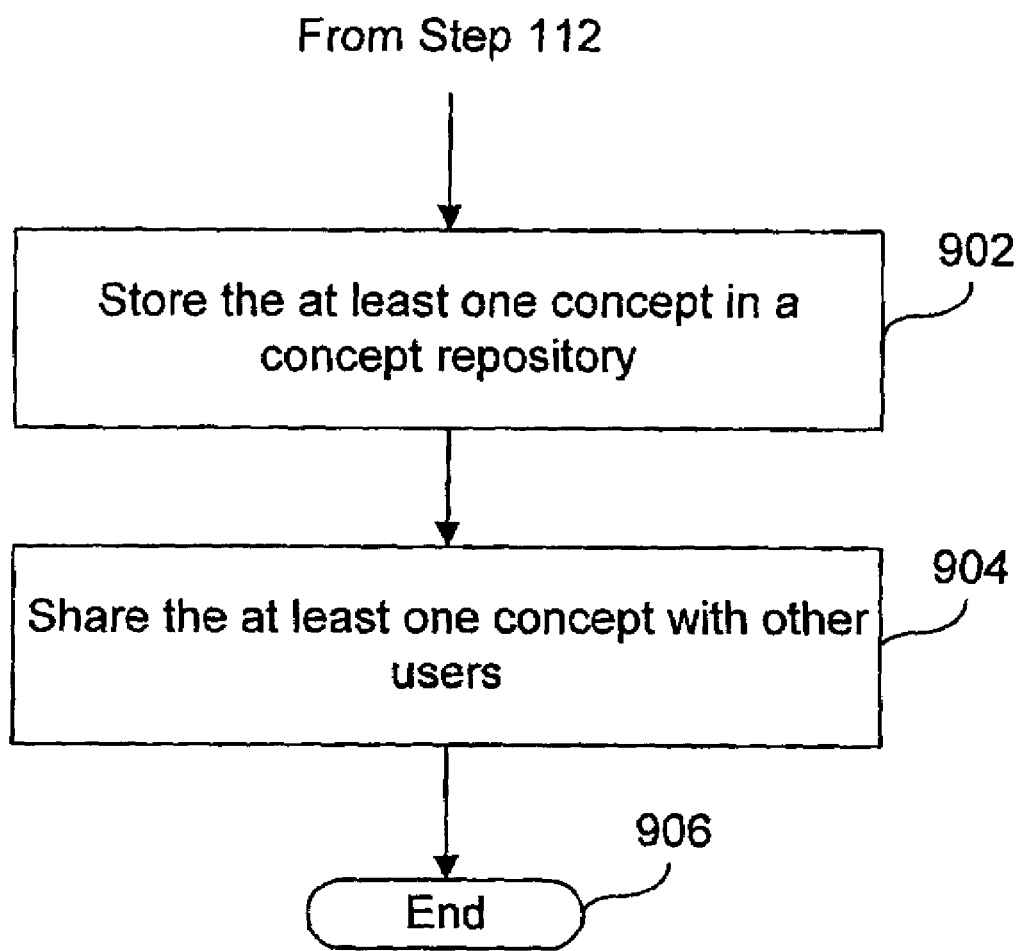
FIG. 9 is a flowchart showing the process of storing and sharing concepts according to an embodiment of the present invention.

As described above, step 112 of FIG. 1 determines whether at least one additional concept exists to create a second set of concepts. FIG. 9 is a flowchart that starts from step 112 and shows the process of storing and sharing concepts according to an embodiment of the present invention. As illustrated in FIG. 9, control passes from step 112 to step 902. In step 902, the at least one concept is stored in a concept repository. Control then passes to step 904. In step 904, the stored concepts are shared with other users. Control then passes to step 906 where the flowchart in FIG. 9 ends.

Figure 2:
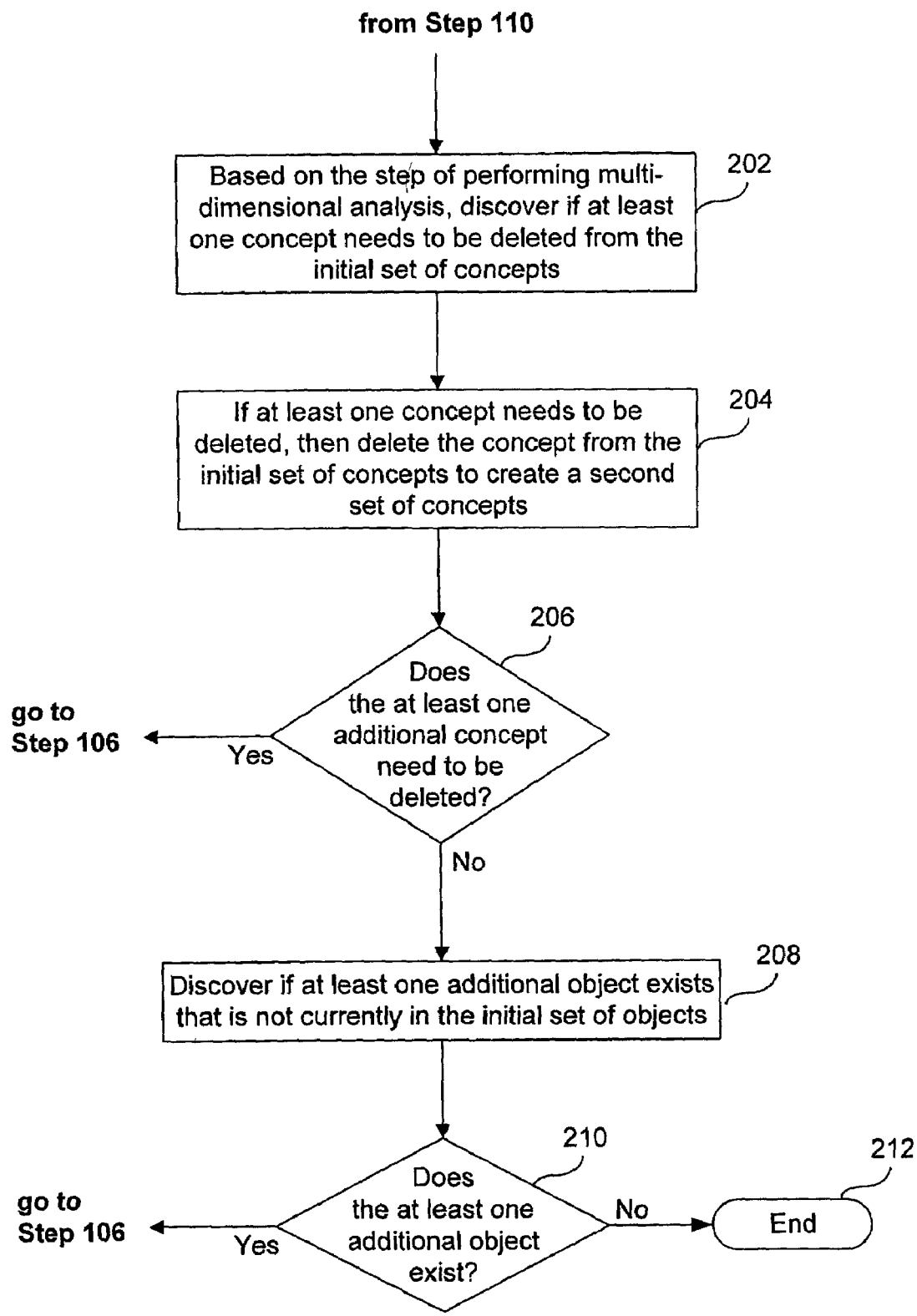
FIG. 2 is a flowchart showing the operation of deleting concepts according to an embodiment of the present invention.

Another embodiment of the present invention involving deletion of additional concepts is shown in the flowchart of FIG. 2. Referring to FIG. 2, control passes from step 110 of FIG. 1 to step 202. In step 202, based on step 110, it is determined whether at least one concept needs to be deleted from the initial set of concepts. Control then passes to step 204. In step 204, if at least one concept needs to be deleted, then the concept is deleted from the initial set of concepts to create a second set of concepts. Control then passes to step 206.

In step 206, if the at least one additional concept needs to be deleted, then control passes back to step 106 in FIG. 1. Otherwise, control passes to step 208. In step 208, it is determined whether the at least one additional object exists outside the initial set of objects. Here, a second set of objects will be created that includes the at least one additional object and the objects in the initial set of objects. Control then passes to step 210. In step 210, if at least one additional object exists, then control passes back to step 106 in FIG. 1 to include the additional object in the initial set of objects to create a second set of objects. Otherwise, control passes to step 212 where the flowchart in FIG. 2 ends.

Figure 10:
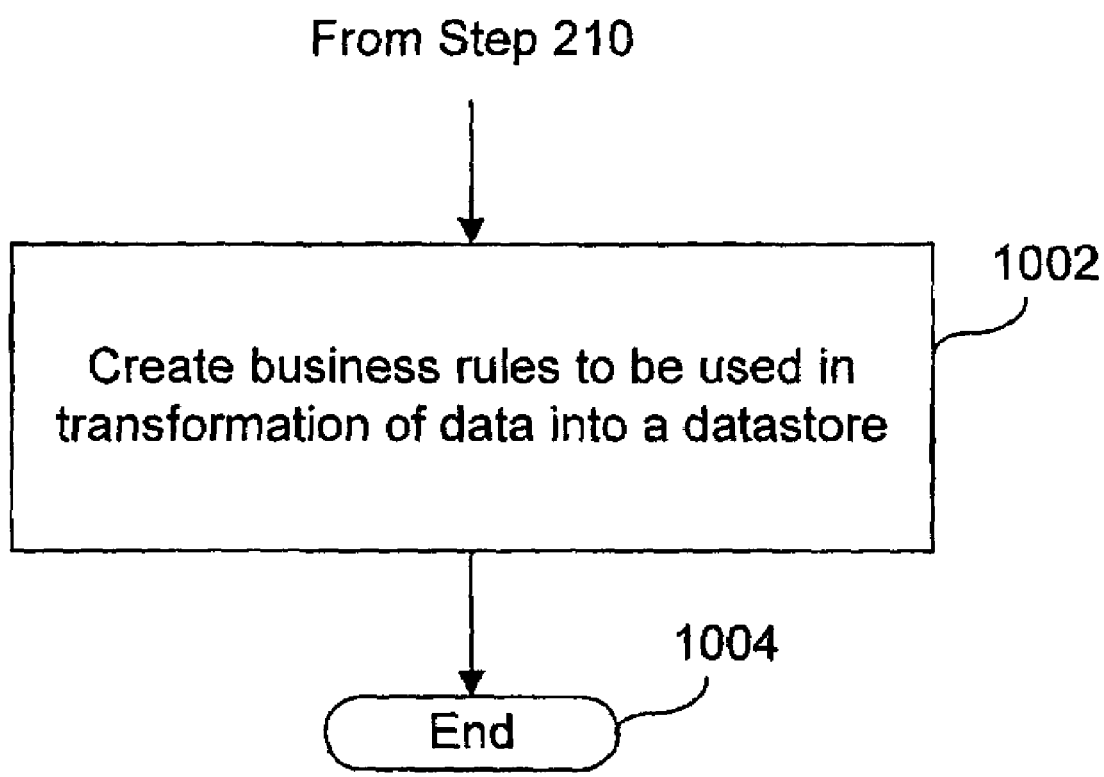
FIG. 10 is a flowchart showing the process of creating business rules according to an embodiment of the present invention.

FIG. 10 illustrates an additional step for the flowchart in FIG. 2. FIG. 10 is a flowchart showing the process of creating business rules according to an embodiment of the present invention. From step 210 of FIG. 2, control passes to step 1002 in FIG. 10. In step 1002, business rules are created to be used in transformation of data into a database. Control then passes to step 1004 where the flowchart in FIG. 10 ends. Different types of objects are described next.

II. OBJECT TYPES

Structured, Unstructured and Semi-Structured

As described above, an object may be a source of information, such as, for example, a single textual document, an email, a web page, a spreadsheet, or any other container (or containers) of information or concepts that may or may not be formatted. Objects may be classified as three different types including structured, unstructured and semi-structured types.

In an embodiment of the present invention, unstructured data is a collection of free form textual information that may or may not be formatted. This includes, but is not limited to, emails, web pages, documents, spreadsheets, and text columns in any type of database.

In an embodiment of the present invention, structured data is a collection of preclassified and presorted objects that have defined and usually unambiguous relationships to other data in the structured data collection. These objects are usually stored in databases such as relational databases of the type, for example, made by Oracle Corporation of Redwood City, Calif. or Microsoft Corporation of Redmond, Wash.

In an embodiment of the present invention, semi-structured data is either: (1) structured data containing unstructured information such as text columns in a structured data column to capture user comments (At some level these comment columns have a defined relationship to all other data objects. However, an analysis of the contents in this comments column may go through natural language processing techniques to yield relevant and actionable outputs.); or (2) unstructured data may have structured components embedded within it such as tables inside a Microsoft Word document or a largely unstructured object containing some structured components, such as the "To", "From", and "Subject" fields of an email.

III. OBJECTS COMPRISED OF OTHER OBJECTS

Objects of the present invention may be comprised of other objects. For example, a corpus may be defined as a collection of objects. The integration of all object types in all domains within varying levels of unstructured and structured components is through the extraction of concepts. An example of linking structured and unstructured components for textual data is to rename the unstructured file with a relevant primary key id (or a combination of relevant keys/ids) of its corresponding structured component in the database. How the present invention extracts concepts is described next.

IV. EXTRACTING CONCEPTS

Figure 3:
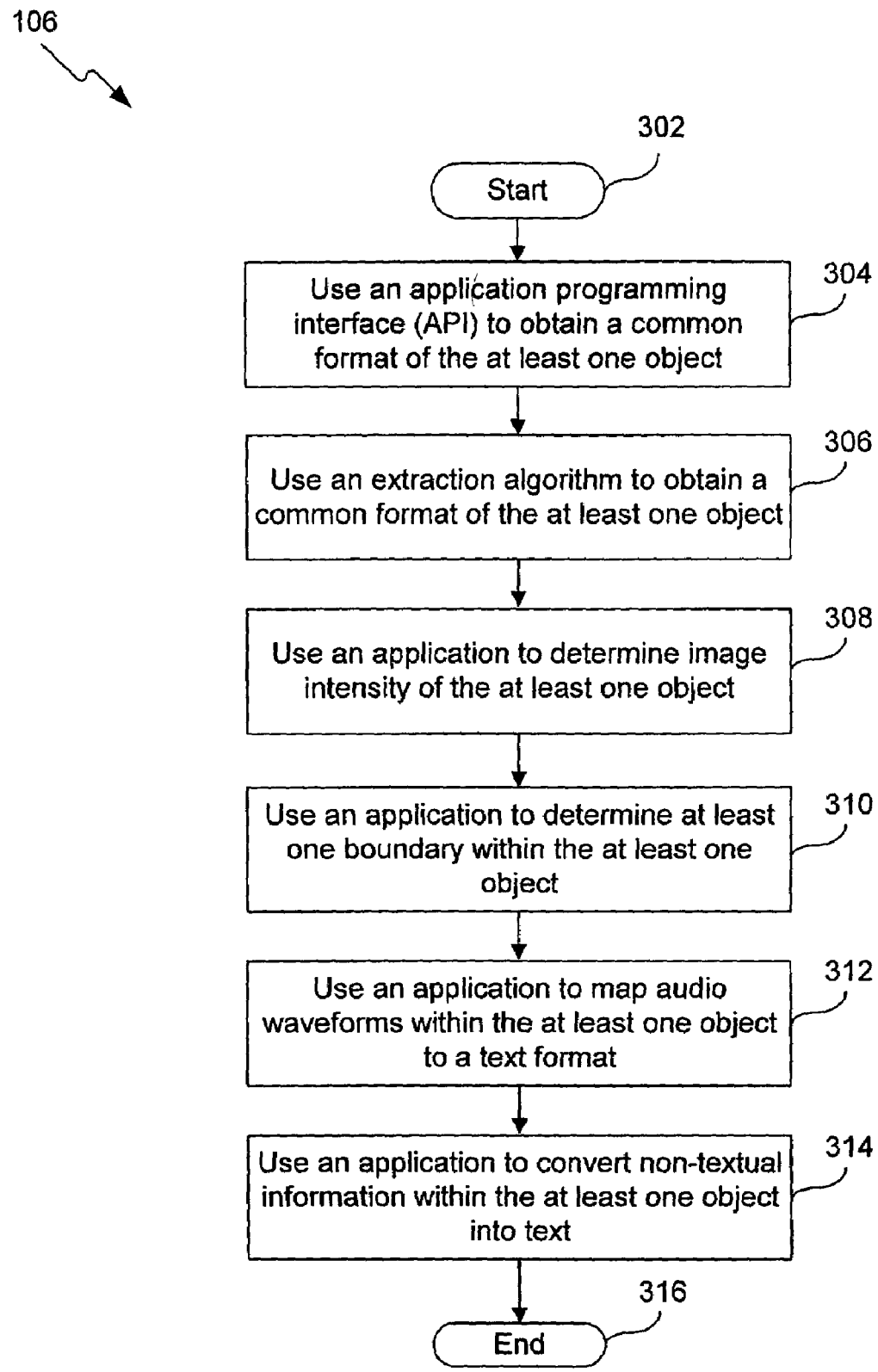
FIG. 3 is a flowchart showing the process of extracting concepts according to an embodiment of the present invention.

As described above in step 106 of FIG. 1, at least one application/algorithm is used to extract the at least one concept from the initial set of objects to create an initial set of concepts. Step 106 is further described with reference to the flowchart in FIG. 3. FIG. 3 illustrates extraction of concepts from a variety of different object types. While the figure is presented in flowchart format, this is done only for convenience of explanation. The illustrated steps may be done in parallel or in any order. Furthermore, some steps may be omitted and/or other steps added depending on the object types (e.g., textual, graphical, human tactile or other sensory objects) that are present for processing.

The flowchart in FIG. 3 starts at step 302 where control passes to step 304. In step 304, an application programming interface (API) is used to obtain a common format of the at least one object. Control then passes to step 306. In step 306, an extraction application/algorithm is used to obtain a common format of the at least one object. There are commercially available extraction algorithms that operate on different domains that may be used to obtain concepts in a common and analyzable format. Control then passes to step 308.

In step 308, an application is used to determine image intensity of the at least one object. Although many other properties of an image may be determined, a common first step to concept extraction usually includes determining the pixel intensity in an image. The properties of a pixel intensity includes color. An example application that can be used to determine image intensity is Adobe Photoshop 7, available from Adobe Systems, Inc., San Jose, Calif. Control then passes to step 310.

In step 310, an application is used to determine at least one boundary (an atomic entity) within the at least one object. From this atomic entity, other features of an image may be determined that may lead to concepts such as boundaries among objects within the image as well as their identities. An example application that can be used to determine at least one boundary is MaskWarrior v1.0, available from Imagiam High Image Techs, SL,_Barcelona, Spain. Control then passes to step 312.

In step 312, an application is used to map audio waveforms within the at least one object to a text format. There are commercially available applications to record voices and transcribe them to text files for concept extraction. An example application that can be used to transcribe recorded voice information is AudioMining & XML Speech Indexing, available from Scansoft, Inc., Peabody, Mass. Control then passes to step 314.

In step 314, an application is used to convert non-textual information within the at least one object into text. An example application for tactile objects that can be used to convert non-textual information into text is ConTacts Discrete Tactile Sensors, available from Pressure Profile Systems, Inc. of Los Angeles, Calif. An example application for olfactory and/or taste objects that can be used to convert non-textual information into text is AROMATRAX®, available from Microanalytics of Round Rock, Tex. Control then passes to step 316 where the flowchart in FIG. 3 ends.

A common theme to each of the applications discussed with respect to FIG. 3 is that the application input may or may not be textual, but the application outputs are in a textual format. Other technologies are available to record objects beyond human perception including, for example, an infrared optoelectronics temperature sensor having temperature limits to 1100° C. such as FiberView 12200 Series from the Williamson Corporation of Concord, Mass. How the present invention refines concepts is described next.

V. REFINING CONCEPTS

Figure 4:
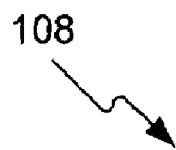
FIG. 4 is a flowchart showing the process of refining concepts according to an embodiment of the present invention.
Figure 4:
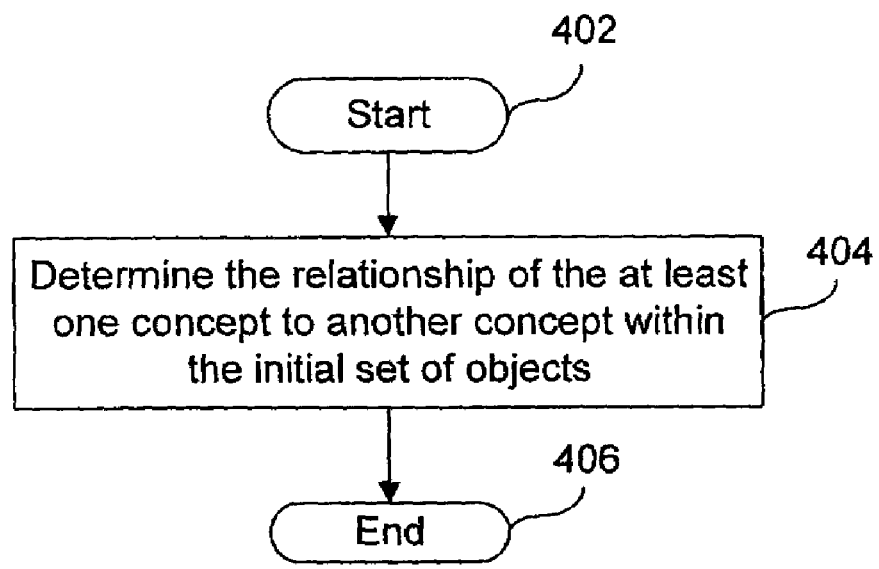
Figure 5:
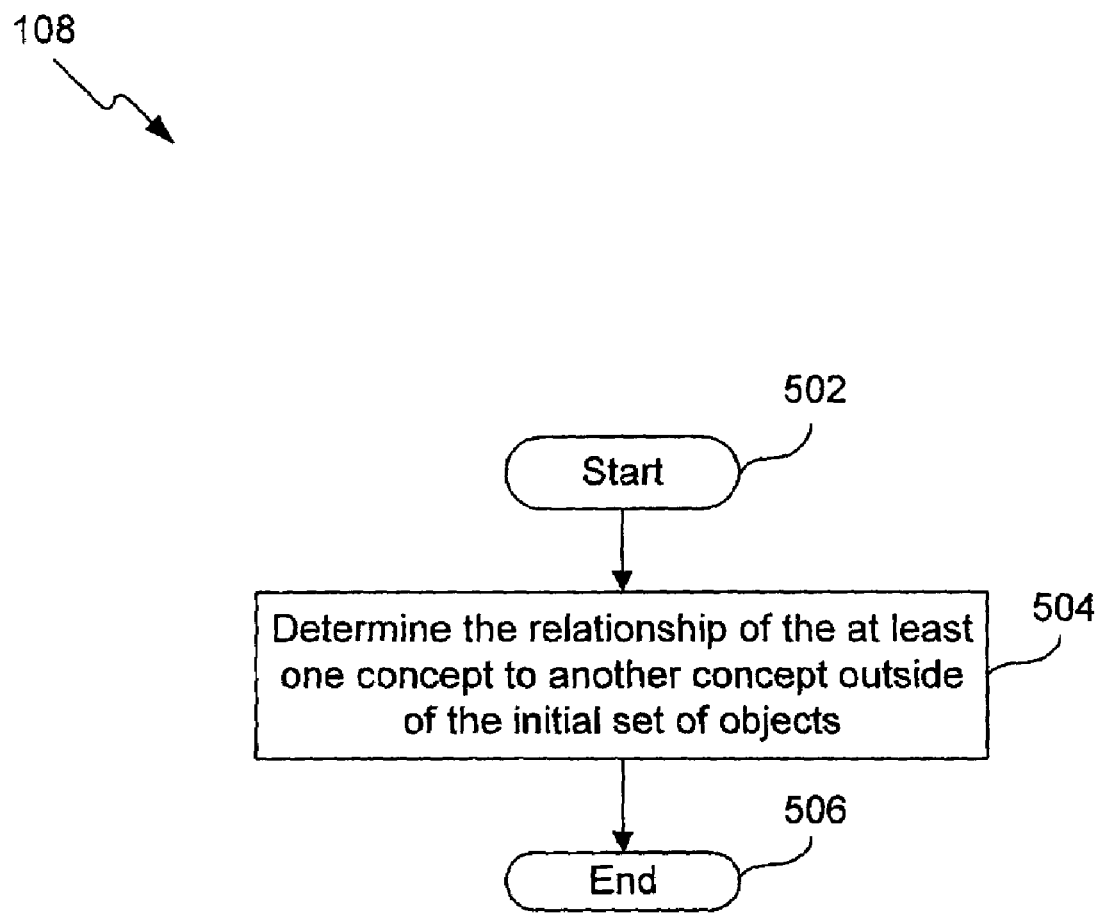
FIG. 5 is a flowchart showing the process of refining concepts according to another embodiment of the present invention.
Figure 6:
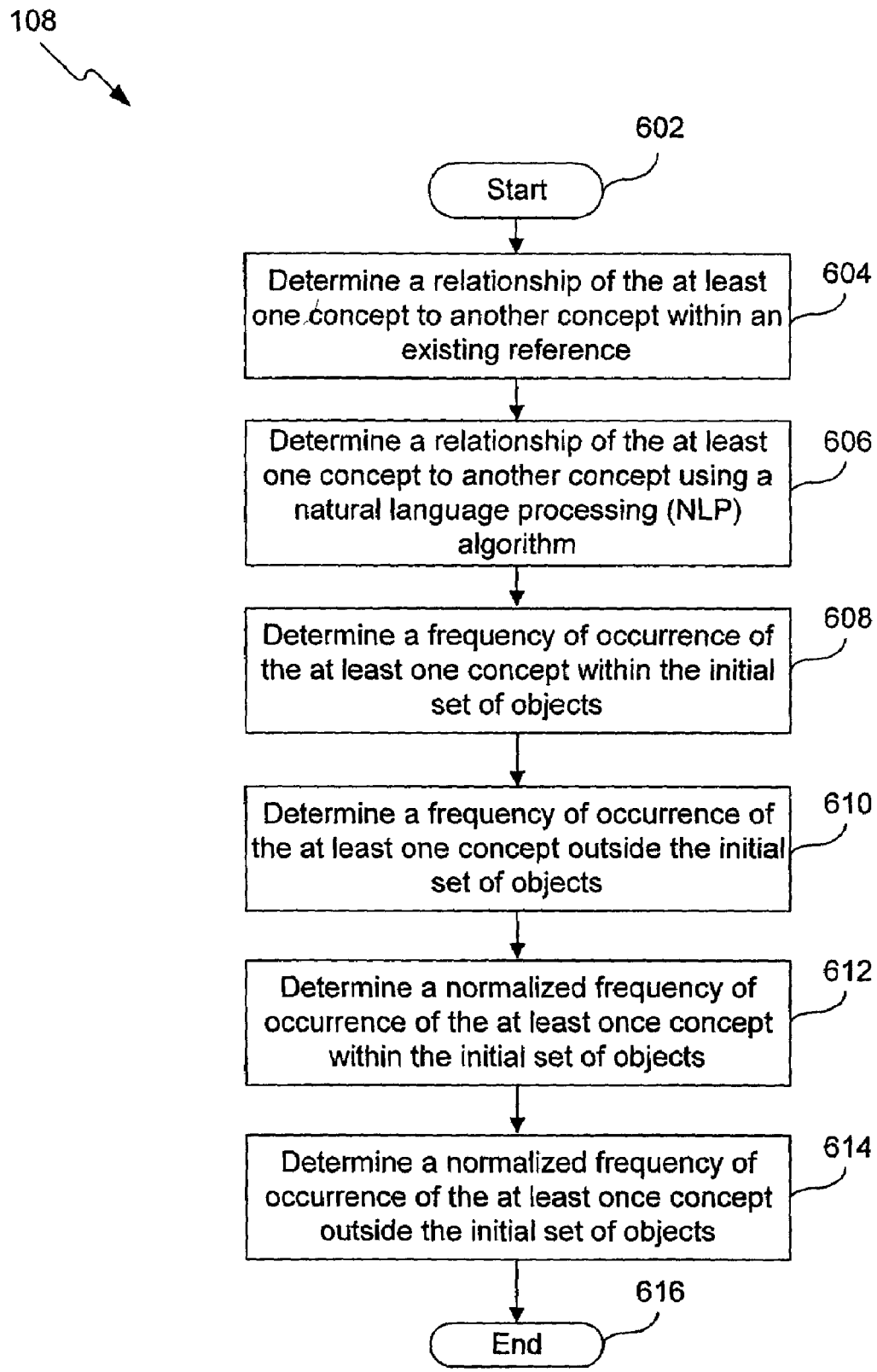
FIG. 6 is a flowchart showing the process of refining concepts according to another embodiment of the present invention.

As described above in step 108 of FIG. 1, at least one concept is refined based on its relationships to other concepts. FIGS. 4-6 each further described step 108.

FIG. 4 starts at step 402 where control passes to step 404. In step 404, the relationship of the at least one concept to another concept within the initial set of objects is determined. Control then passes to step 406 where the flowchart in FIG. 4 ends.

FIG. 5 starts at step 502 where control passes to step 504. In step 504, the relationship of the at least one concept to another concept outside the initial set of objects is determined. Control then passes to step 506 where the flowchart in FIG. 5 ends.

FIG. 6 illustrates other embodiments of refining a concept based on its relationship to other concepts. While the figure is presented in flowchart format, this is done only for convenience of explanation. The illustrated steps may be done in parallel or in any order. Furthermore, some steps may be omitted and/or other steps added. FIG. 6 starts at step 602 where control passes to step 604. In step 604, a relationship of the at least one concept to another concept within an existing reference is determined. Here, the existing reference may be, for example, an English thesaurus, an English dictionary, a non-English thesaurus, a non-English dictionary, a domain specific thesaurus, a domain specific dictionary, etc. Control then passes to step 606.

In step 606, a relationship of the at least one concept to another concept using a natural language processing (NLP) algorithm is determined. Control then passes to step 608. In step 608 a frequency of occurrence of the at least one concept within the initial set of objects is determined. Control then passes to step 610. In step 610, a frequency of occurrence of the at least one concept outside the initial set of objects is determined. Control then passes to step 612.

In step 612, a normalized frequency of occurrence of the at least one concept within the initial set of objects is determined. Control then passes to step 614. In step 614, a normalized frequency of occurrence of the at least one concept outside the initial set of objects is determined. Control then passes to step 616 where the flowchart in FIG. 6 ends. The multi-dimensional analysis of the present invention is described next.

VI. MULTI-DIMENSIONAL ANALYSIS

As described above in step 110 of FIG. 1, multi-dimensional analysis is performed on the at least one concept present in the initial set of objects. This step includes slicing-and-dicing across at least one dimension of the initial set of objects. Examples of the one dimension include but are not limited to a time dimension, a geographical location dimension, an electronic location dimension, a person dimension, a multiple-person dimension, a business unit dimension, an organization dimension, a process dimension, a product dimension, a service dimension, a subject dimension, a category dimension, a concept dimension, a concept type dimension, a user viewpoint dimension, and an entity dimension in a structured database.

Figure 7A:
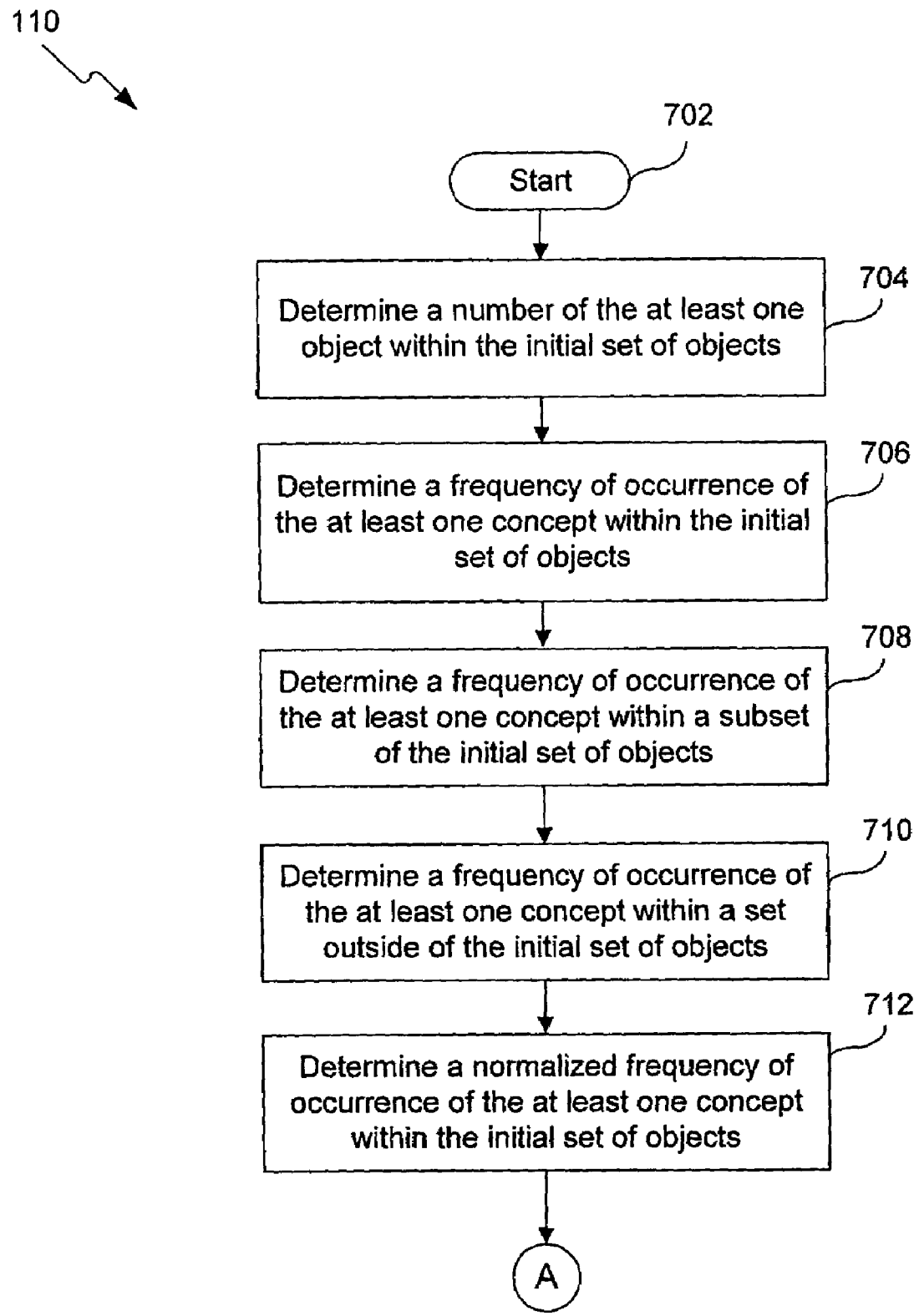
FIGS. 7A and 7B are a flowchart showing the process of performing multi-dimensional analysis on the concepts according to an embodiment of the present invention.
Figure 7B:
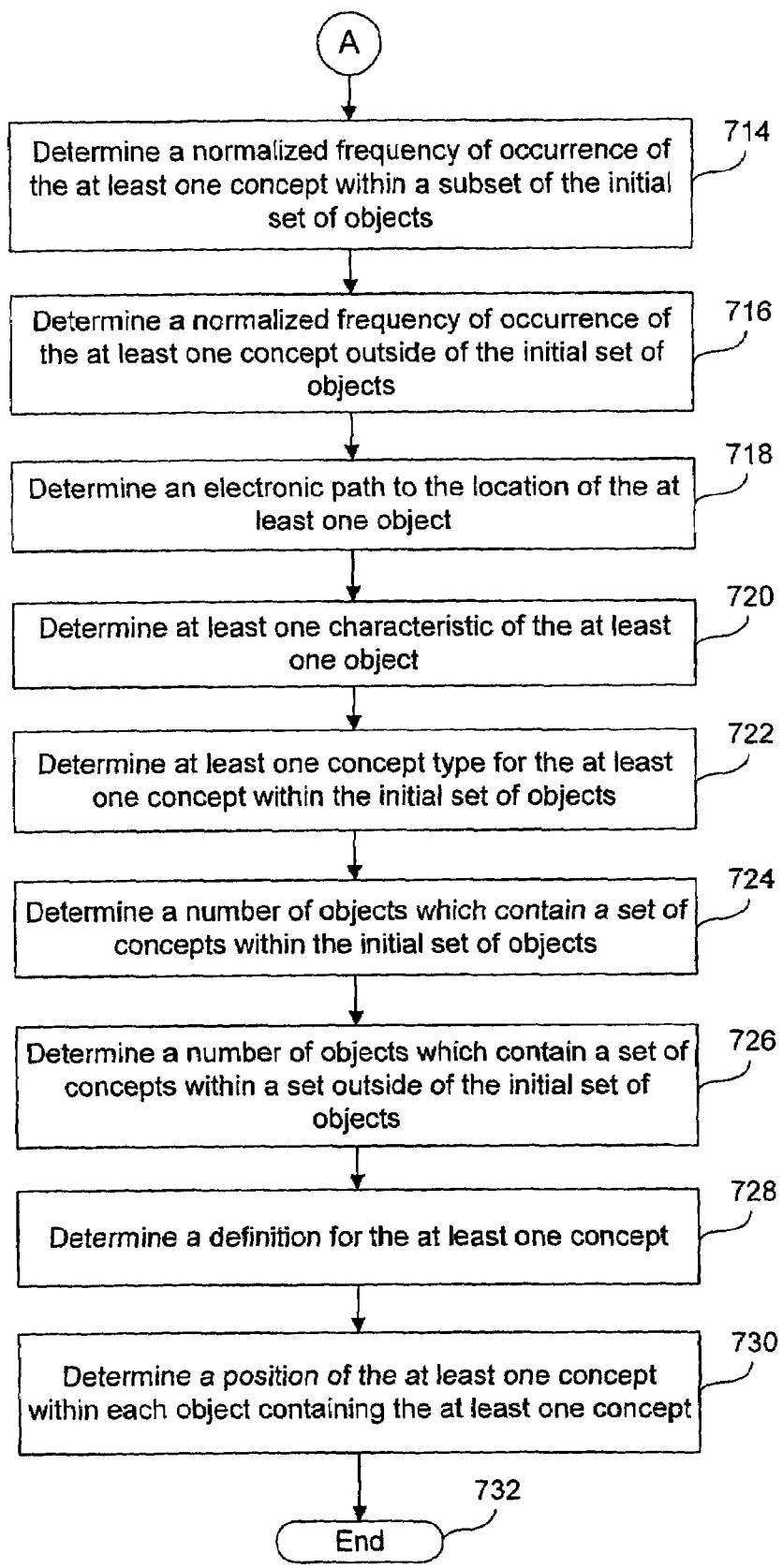

Step 110 is further described next with reference to FIGS. 7A and 7B. FIGS. 7A and 7B illustrate steps of performing multi-dimensional analysis in accordance with the present invention. While the figure is presented in flowchart format, this is done only for convenience of explanation. The illustrated steps may be done in parallel or in any order. Furthermore, some steps may be omitted and/or other steps added. Multi-dimensional analysis (also called on-line analytical processing or OLAP) generally involves drill down, slice and dice and graphical analysis. In drill down, for example, a user can explore a dimension hierarchically, moving from summary-level information to detailed information and back, to gain fast answers to critical business questions. In slice and dice, for example, a user can interactively explore corporate data in any combination of dimensions, from different angles or perspectives. In graphical analysis, for example, a user can choose from a variety of graphical displays—crosstabs, pie charts and a variety of bar charts—to visualize key factors that are driving a business. An embodiment of multi-dimensional analysis is described in further detail in U.S. patent application Ser. No. 10/393,677, filed Mar. 19, 2003, which is incorporated herein by reference as if reproduced in full below.

The flowchart in FIG. 7A starts at step 702 where control passes to step 704. In step 704, the number of objects within the initial set of objects is determined. Control then passes to step 706. In step 706, a frequency of occurrence of the at least one concept within the initial set of objects is determined. Control then passes to step 708. In step 708, a frequency of occurrence of the at least one concept within a subset of the initial set of objects is determined. Control then passes to step 710. In step 710, a frequency of occurrence of the at least one concept within a set outside of the initial set of objects is determined. Control then passes to step 712.

In step 712, a normalized frequency of occurrence of the at least one concept within the initial set of objects is determined. Control then passes to step 714 of FIG. 7B. In step 714, a normalized frequency of occurrence of the at least one concept within a subset of the initial set of objects is determined. Control then passes to step 716. In step 716, a normalized frequency of occurrence of the at least one concept outside of the initial set of objects is determined. Control then passes to step 718.

In step 718, an electronic path to the location of the at least one object is determined. Control then passes to step 720. In step 720, at least one characteristic of the at least one object is determined. Control then passes to step 722. In step 722, at least one concept type for the at least one concept within the initial set of objects is determined. Control then passes to step 724. In step 724, a number of objects which contain a set of concepts within the initial set of objects is determined. Control then passes to step 726.

In step 726, a number of objects which contain a set of concepts within a set outside of the initial set of objects is determined. Control then passes to step 728. In step 728, a definition for the at least one concept is determined. Control then passes to step 730. In step 730, a position of the at least one concept within each object containing the at least one concept is determined. Control then passes to step 732 where the flowchart of FIG. 7B ends.

VII. WORKING EXAMPLE OF THE PRESENT INVENTION

A working example of the present invention is described next. This working example is provided to facilitate the understanding of the present invention and is not meant to limit the scope of the invention.

Assume a Company XYZ manages credit card services for five national retail chains: Retailer A, Retailer B, Retailer C, Retailer D, and Retailer E. As part of this service, XYZ runs customer call centers that receive calls from customers, answer questions, and provide other services. Customer service representatives record the substance of each customer call. The customer call records are then stored as free-form text (a/k/a "unstructured data") in a column in XYZ's customer relationship management database, which also tracks other information related to each call.

Assume XYZ wants to analyze 100,000 customer call records to find ways to improve its business processes. Previously, XYZ analysts had to manually read the records from a randomly selected sample of the calls. However, because of the tremendous volume of calls that its call centers received, the number of calls the group of analysts could read was statistically insignificant. XYZ provides the network address of these text file calls on their isolated local computer drive, a local area network (LAN) or a wide area network (WAN). Furthermore, the location of a related database may be provided as being located on a computer disk drive, a LAN, or a WAN.

Electronic files stored in the database may be one or more of the following types: Program File (*.exe), Text File (*.txt, *.prn, *.csv), Word Document (*.doc), Rich Text Format (*.rtf), Windows Write (*.wri), Word for Macintosh (*.mcw), MS-DOS Text with Layout (*.asc), Text with Layout (*.ans), E-mails (*.eml), Outlook Address Book (*.olk), Personal Address Book (*.pab), WordPerfect file (*.wpd), Schedule+ Contact (*.scd), Powerpoint (*.ppt), Harvard Graphics Show (*.sh3), Harvard Graphics Chart (*.ch3), Freelance Windows file (*.pre), Excel File (*.xl*), Adobe Acrobat File (*.pdf), Web Page (*.htm*, *.asp, *.jsp), Query File (*.*qy), Lotus 1-2-3 File (*.wk*), Quattro Pro/Dos File (*.wq1), Microsoft Works File (*.wks), Works for Window (*.wps), Microsoft Access Files (*.mdb), Dbase Files (*.dbf), SYLK Files (*.slk), Data Interchange Format File (*.dif), Backup File (*.bak), Quattro Pro 1.0/5.0 (win) (*.wbl), Text Recovered from any File (*.*), Graphic Interchange Format (*.gif), Windows Bitmap (*.bmp), JPEG file interchange format (*.jpg), Tag image file format (*.tif), portable network graphics (*.png), Kodac Photo CD (*.pcd), PC Paintbrush (*.pcx), Raster file (*.ras), Audio File (*.wav, *.snd, *.aif, *.aifc, *.aiff, *.wma, *.mp3), CD Audio Track (*.cda), Media Playlist (*.asx, *.wax, *.m3u, *.wvx), MIDI File (*.mid, *.rmi, *.midi), Movie File (*.mpeg, *.mpg, *.m1v, *.mp2, *.mpa, *.mpe), Video File (*.avi, *.wmv), Windows Media File (*.asf, *.wm, *.wma, *.wmv), and Tactile Sensing File in ASCII, LabView, or MATLAB formats.

These electronic file formats derived from other applications may use known transformation functions to extract concepts. For example, text based formats may use natural language processing and industry or standard references such as thesauri and dictionaries. Graphics based formats may use image segmentation and classification application/algorithms for concept extraction. Pressure, temperature and other tactile physical sensations such as roughness, smoothness and stickiness are reducible to electronic recordings and can be abstracted as concepts. Voice recordings may also be abstracted as concepts. Olfaction sensor arrays produce recordings that may also be abstracted as concepts. Biochemical assays to determine taste concepts such as sweet, bitter, sour, salty and other differentially identified chemosensory stimuli may also be abstracted as concepts.

It is important to note that these abstracted concepts from all of these varying human perceptions may be stored in textual format, but it is not required. There are some concepts that are imperceptible to the human perception such as gamma rays in the electromagnetic spectrum. Furthermore, it may be important to integrate multiple perceptions simultaneously to fully characterize and remove ambiguity from information such as voice intonation, facial expression and text containing emotion (such as laughter and sarcasm). Consider, for example, the meaning of the sarcastically made statement "You must be a genius!". Known applications/algorithms as previously indicated may extract concepts from all these perceptions beyond and/or within the boundaries of human perception.

Although the objects and resulting concepts of the present invention may be of any electronic format, the example described herein reduces concepts to textual format for analysis by a natural language processing algorithm. If the common format is a graphical format, then standard segmentation and classification image processing applications/algorithms apply. This rule similarly applies for other format domains.

The concepts may be refined based upon their relationships to other concepts (step 108 of FIG. 1). For example, using natural language processing software, XYZ extracts all of the words within its customer call records. The software automatically ignores commonly-used stop words, such as: "the", "if", "and", "but", "or", etc. Assume that the words extracted are as follows:

explained, explnd, xplnd, explanation, explain, xpln, expln;

educate, educ, educat, edcate, educt, edu;

reward, rewards, rwrds, rwrd, rewrd, rewrds;

close, cls, clos;

account, acct, accnt, acount, acnt.

The reason for the unfamiliar words in the call records is that the customer service representatives often use a form of short-hand to record the calls. Using an internal company thesaurus or an industry domain expert, XYZ creates the following concepts (step 404 of FIG. 4 and/or step 604 of FIG. 6):

Explain="explained" or "explnd" or "xplnd" or "explanation" or "explain" or "xpln" or "expln" (i.e. whenever one of these words appear, the software will recognize an occurrence of the concept "Explain");

Educate="educate" or "educ" or "educat" or "edcate" or "educt" or "edu";

Reward_Points="reward" or "rewards" or "rwrds" or "rwrd" or "rewrd" or "rewrds";

Close="close" or "cls" or "clos"; and

Account="account" or "acct" or "accnt" or "account" or "acnt".

The frequency of occurrence of individual child concepts are counted and totaled for its parent concept within the initial set of objects (step 608 of FIG. 6). These frequencies of occurrence within the initial set of concepts may also be normalized by document count, hit count, or other standard natural language processing normalization procedures (step 612 of FIG. 6).

XYZ then uses an English-language thesaurus to discover that Explain and Educate are synonyms (step 504 of FIG. 5 and/or step 606 of FIG. 6). Thus, XYZ modifies the definition of Explain so that Educate becomes a child-concept of Explain (similarly, Explain becomes the parent-concept of Educate). That is to say that Explain is now defined as follows:

Explain="explained" or "explnd" or "xplnd" or "explanation" or "explain" or "xpln" or "expln" or "educate" or "educ" or "educat" or "edcate" or "educt" or "edu".

The frequency of occurrence of individual child concepts from this combined internal and external reference are counted and totaled for its parent concept within and outside the initial set of objects (step 610 of FIG. 6). These frequencies of occurrence outside the initial set of concepts may also be normalized by document count, hit count, or other standard natural language processing normalization procedures (step 614 of FIG. 6).

It is the interaction of multiple stakeholders that generate this list of child concepts for a particular parent concept both within and outside of the organization. A multi-user environment is important to maintain this dynamic list as words may be deleted or added to any parent concept with time and events. For example, a new service representative may use "xpn" as a shorthand for "explain," or a representative whose employment is terminated may have been the only one who shorthands "explain" with "xpln" (step 202 of FIG. 2). If a concept is deleted, then a second set of concepts is created from the initial set of concepts because relationships among concepts may change as a result of this deletion (step 204 of FIG. 2). The multi-dimensional analysis may be repeated to determine what other concepts may be deleted (step 206 to step 106 in FIGS. 1 and 2).

Furthermore, the business may evolve to have a product named "XPLND," so further child concept refinement is required to separate documents that refer to the product "XPLND" versus the shorthand for explain "xplnd." A deletion of a child concept may occur for one parent concept, while a simultaneous creation of a new parent and child concept combination is created (step 208 of FIG. 2). Multi-dimensional analysis may be repeated until the information void is filled as a result of the concept deletions (step 210 to step 106 of FIGS. 1 and 2).

The method discussed thus far in this example confirms information already known by stakeholders. The revelation of the requirement for novel business processes, however, requires performing multi-dimensional analysis on at least one concept present in the initial set of objects (step 112 of FIG. 1). An example of multi-dimensional analysis is XYZ performing multi-dimensional analysis on the call records while focusing on the newly defined concepts, as described below:

First, XYZ drilled-down on several occurrences of each of the concepts in order to view the context and verify that the concept was correctly identified.

Second, XYZ performed relationship discovery on the call records and discovered that twenty percent (20%) of the time that Explain occurred, the concept Reward_Points occurred within two (2) words of Explain. Thus, XYZ created a new concept called Explain_Reward_Points, which occurred whenever Reward_Points occurred within two (2) words of Explain.

Third, XYZ performed relationship discovery on the call records and discovered that ninety percent (90%) of the time that Close occurred, the concept Account occurred within two (2) words of Close. Thus, XYZ created a new concept called Close_Account, which occurred whenever Close occurred within two (2) words of Account.

At this point, XYZ develops a hypothesis that customer calls seeking an explanation of the Reward Points system could be eliminated if the explanation were provided on their website or as an automatic option on their interactive voice response (IVR) system. This would save XYZ money because the number of calls that required human interaction would be reduced and they could hire fewer customer service representatives.

XYZ again performs multi-dimensional analysis on the call records (this time focusing on the newly defined concept Explain_Reward_Points). Using summarization, XYZ concludes that Explain_Reward_Points occurred in five percent (5%) of the call records analyzed, or 5,000 call records.

However, XYZ also realizes that customers call for multiple reasons. Thus, call records containing Explain_Reward_Points may not necessarily be eliminated by offering an explanation if the customer also called for another reason (to close his or her account for example). This example involves an increasingly complex and expanding set of objects, along with their resulting concepts and nested concept relationships. However, discovered concepts may also be single objects.

To that end, XYZ again performs multi-dimensional analysis on the call records (this time focusing on the newly defined concepts Explain_Reward_Points and Close_Account). Using relationship discovery, XYZ discovers that ten percent (10%) of the time that Explain_Reward_Points occurred, Close_Account occurred within the same call record. This time, XYZ creates a new concept called Explain_Reward_Points_w/o_Close_Account, which occurs whenever Explain_Reward_Points occurs and Close_Account DID NOT occur within the same document.

XYZ once again performs multi-dimensional analysis on the call records (this time focusing on the newly defined concept Explain_Reward_Points_w/o_Close_Account). Using summarization, XYZ concluded that Explain_Reward_Points_w/o_Close_Account occurred in four and one-half percent (4.5%) of the call records analyzed, or 4,500 call records.

Next, XYZ wants to determine which retail chains were generating the most calls seeking an explanation of the Reward Points system. The retail chain that generated each call is stored in the "Retailer" column of structured data in XYZ's customer relationship management database. XYZ created five new concepts to identify which retailer is generating a call:

Retailer_A: occurs whenever the Retailer column of the database="Retailer A";
Retailer_B: occurs whenever the Retailer column of the database="Retailer B";
Retailer_C: occurs whenever the Retailer column of the database="Retailer C";
Retailer_D: occurs whenever the Retailer column of the database="Retailer D";
Retailer_E: occurs whenever the Retailer column of the database="Retailer E".

XYZ then creates a new concept type called Retailer.

Figure 24:
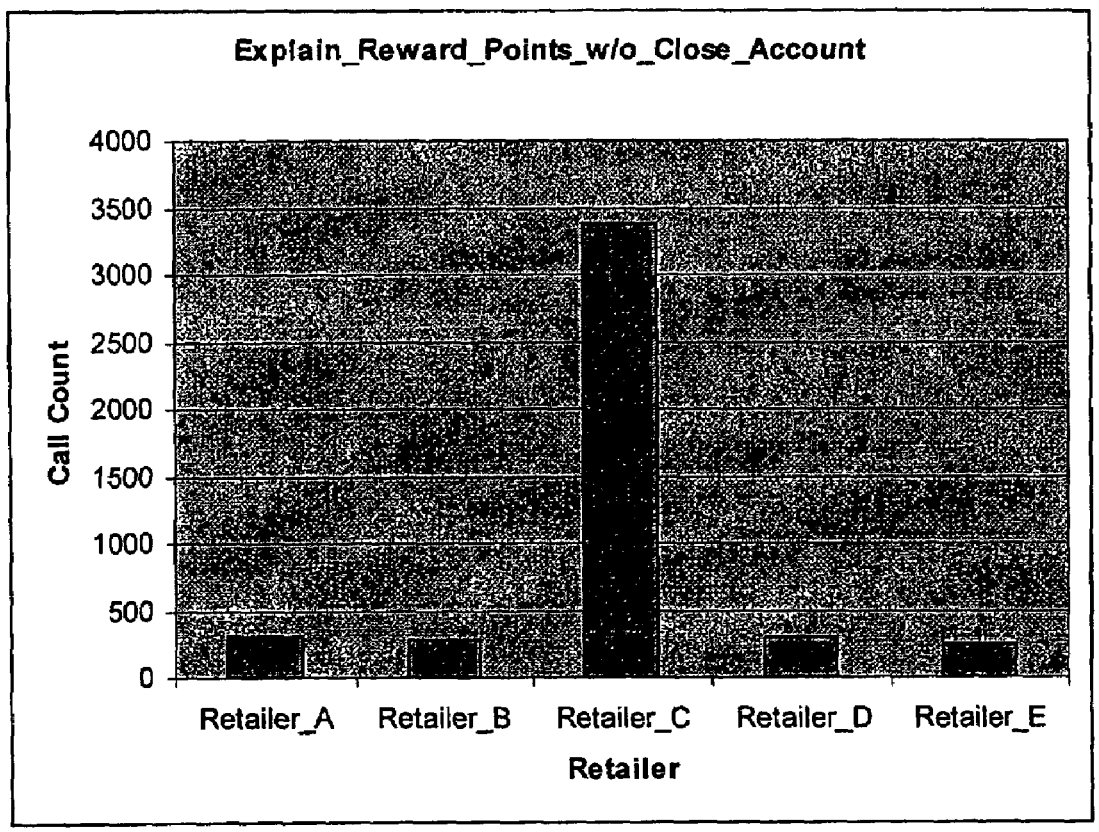
FIG. 24 illustrates data visualization according to an embodiment of the present invention.

XYZ once again performs multi-dimensional analysis on the call records (this time focusing on the concept Explain_Reward_Points_w/o_Close_Account; the concept type Retailer; and all of its associated concepts: Retailer_A, Retailer_B, Retailer_C, Retailer_D, & Retailer_E). XYZ is able to slice-and-dice the call records containing Explain_Reward_Points_w/o_Close_Account and thus view them by retailer as a report of the resulting analysis (step 804 of FIG. 8). Then, using data visualization, XYZ is able to easily see that the vast majority (75%) of customer calls which were only related to an explanation of the Reward Points system came from Retailer C (step 804 of FIG. 8) as shown in FIG. 24.

After these iterations with multi-dimensional analysis, it is determined that no further concept exists that is relevant to the information needs of this analyst at this particular time (step 114 to step 116 in FIG. 1).

Although no further concepts from the initial set of concepts exist, the resulting outputs lead the analyst to seek additional objects to create a second set of objects as part of fulfilling and completing the information exploration and determining/recommending corrective action(s) (step 116 of FIG. 1). If new and relevant information objects are found, then the method repeats (step 118 to step 106 in FIG. 1). For example, upon investigation, XYZ discovers that Retailer C was the only retailer that did not have an explanation of the Reward Points system on its website or as an automated option on their interactive voice response (IVR) system. XYZ can quickly remedy the situation, reducing its total call volume and cutting costs.

This example ends when the information needs are satisfied and/or no more objects or concepts exist or can reasonably be discovered (step 120 of FIG. 1).

The resulting exploration of relevant objects and concepts creates at least one concept that can be stored in a concept repository (step 902 of FIG. 9). The initial set of concepts may also be stored in a concept repository during refinement. These concept repositories may have read, write and delete permission for sharing with other users to permit concept relevancy refinement and to identify the information needs boundary within and outside of an organization (step 904 of FIG. 9). Users may simultaneously access and refine pre-defined sets of concepts relevant to different goals of an organization such as product development, revenue enhancement, cost reduction, competitor intelligence, and recruitment.

Furthermore, as concepts and objects are refined new business rules are created and used in transformation of other new and pre-existing objects or data into a datastore (step 1002 of FIG. 10).

Example Graphical User Interfaces (GUI) of the Present Invention

Figure 11:
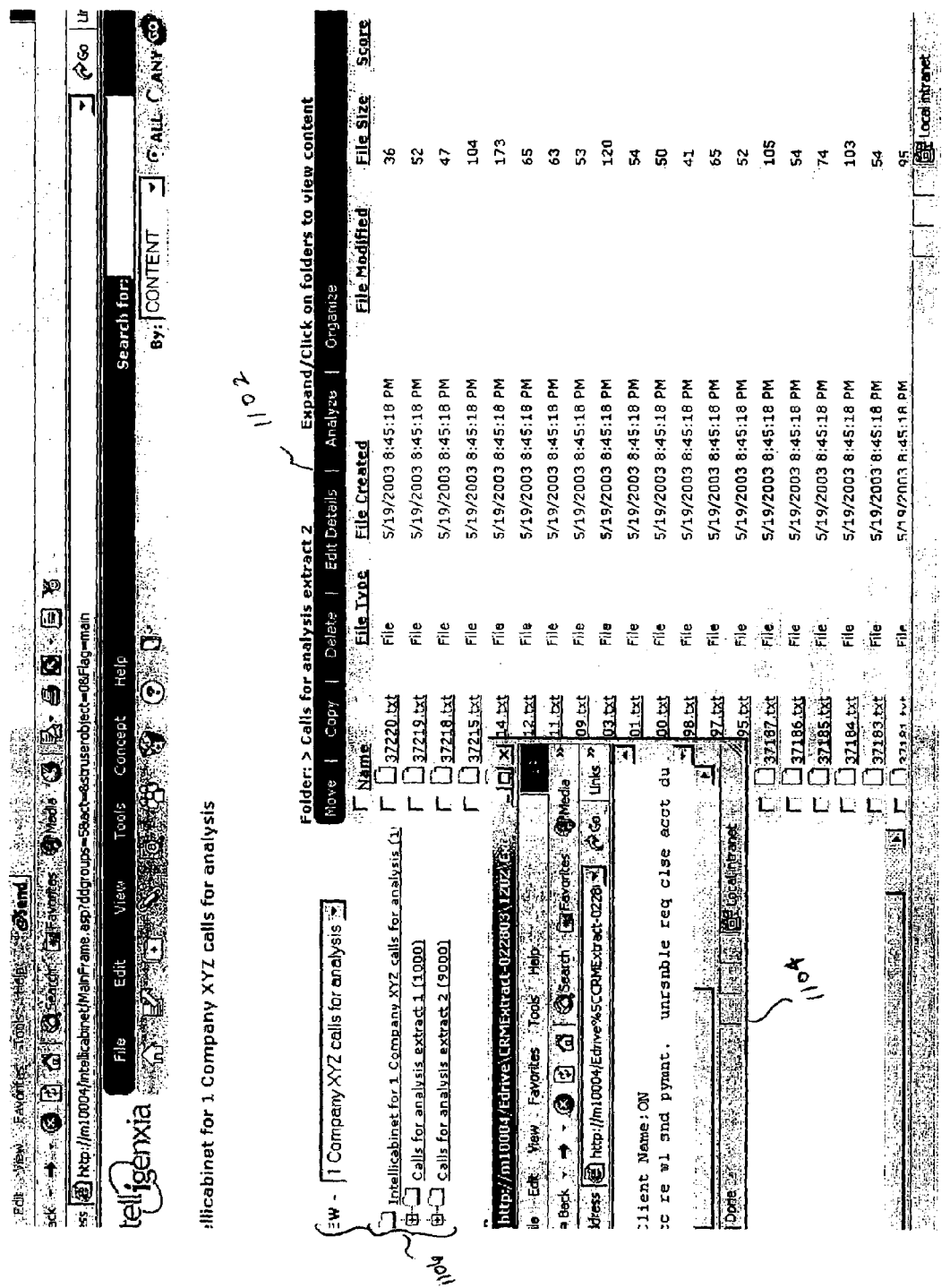

FIG. 11 is an example graphical user interface (GUI) of the present invention that illustrates a toolbar 1102 of options for manipulating objects within the corpus. The options shown include move or copy objects to another corpus or folder, delete objects, and actions that can be manipulated on the objects such as edit details, analyze and organize. The underlined filenames to the objects are links to the original files and, when selected, will open the file in a new browser window 1104. Concepts may be verified and refined by examining the original document for context. There is also the ability to examine different concept repositories or corpus in the "view" drop down area 1106, where an expandable file tree is also available. In this example, the text files have already been extracted and loaded into the application and are ready for analysis.

Figure 12:
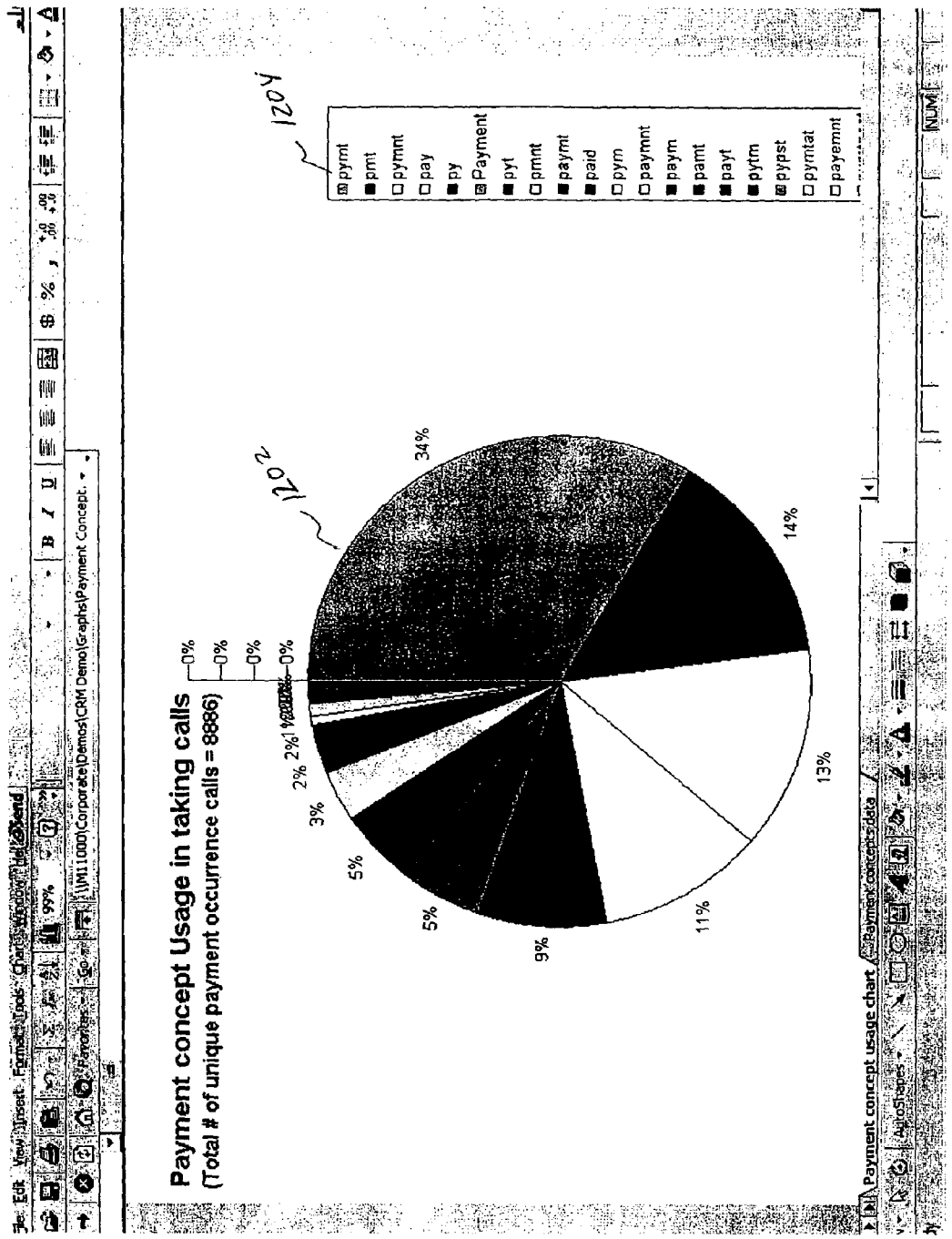

FIG. 12 illustrates a pie chart 1202 that examines the child concept variation for the parent concept "Payment." Also shown in FIG. 12 is a legend 1204 of the child concept distribution in pie chart 1202. This visualization permits a user to refine the child concepts by deleting or adding synonyms to particular child concepts that represent a greater proportion of the pie (dominant child concepts).

Figure 13:
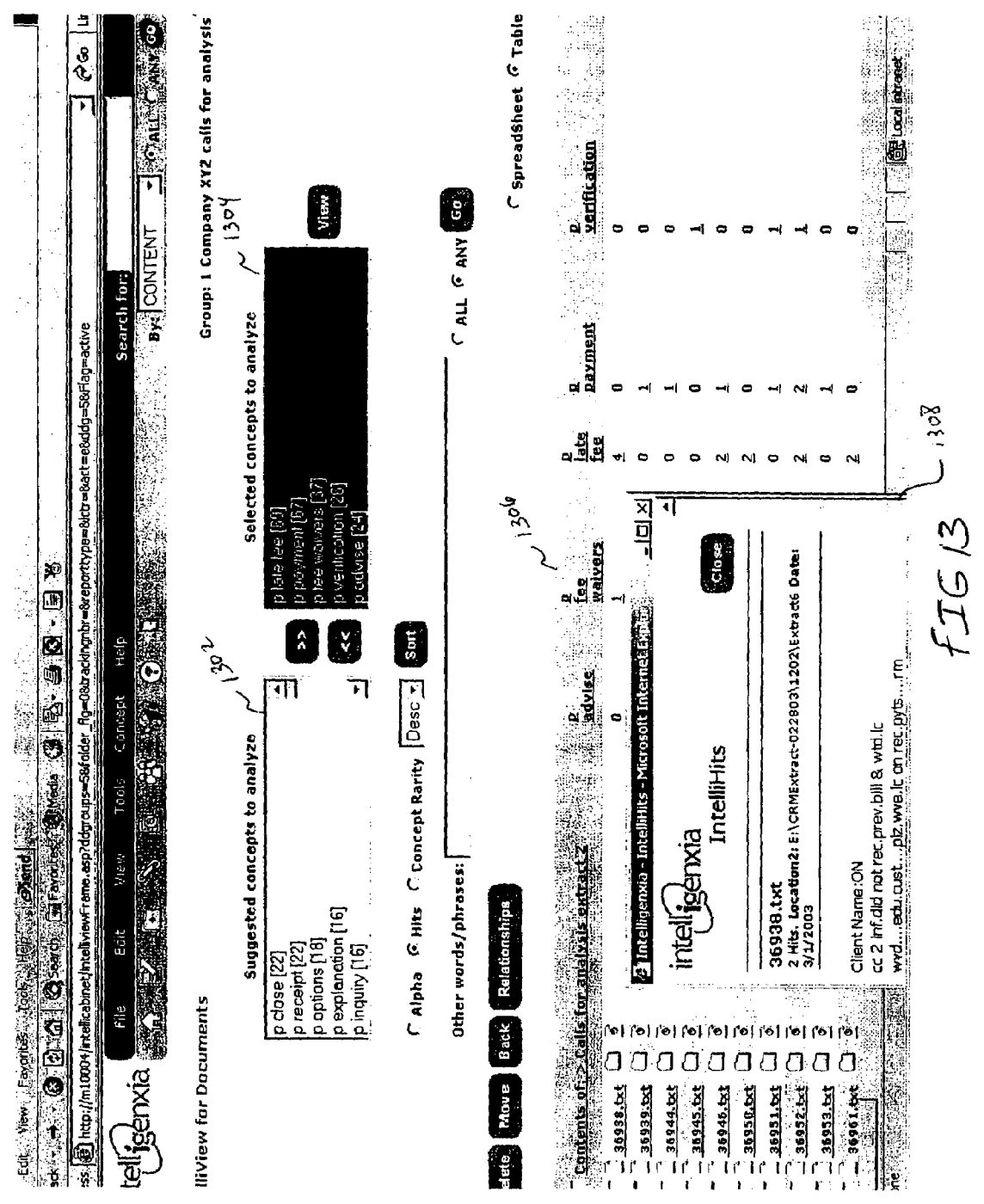

After refining parent and child concepts, an analysis of the highest frequency parent concepts may be determined. An examination of these parent concept frequencies leads to a set of high yield parent concepts that should be further analyzed. These concepts are labeled as concept type "p" for primary call reason and are illustrated in the GUI of FIG. 13. FIG. 13 illustrates a "suggested concepts to analyze" menu 1302, a "selected concepts to analyze" menu 1304, a frequency of occurrence menu 1306 and a hits menu 1308.

Menu 1302 shows the "p" parent concepts that are suggested concepts to analyze. The selected concepts undergoing analysis is shown in menu 1304. Menu 1306 shows the results of the analysis as "p" parent concepts in columns, and the documents where their associated child concepts may be found in the rows, with their intersection showing frequency of occurrence. Analyzing this output is part of the multi-dimensional analysis of drill down as more complex concepts are discovered. For example, in the first row of menu 1306, "p fee waivers" and "p late fee" occur together for object 36938.txt. There may be cause to examine the combination of these concepts as a newly discovered concept of "p fee waivers" within 5 words of "p late fee" within objects as an example relationship. The underlined objects are links to the original object that can be verified for the existence of this complex relationship in menu 1308.

Concept type "P" represents the possible problems of calls leading to business expenses that the organization would like to minimize to improve revenue and profit. In general, concepts types relate to aspects or dimensions within business processes such as products, components, services, actions taken, processes within and outside the company, symptoms, suppliers, or any combination of the above. Concept types primarily clarify an analysis for the user. Thus, concept types facilitate knowledge discovery and lead to new actionable insights.

Figure 14:
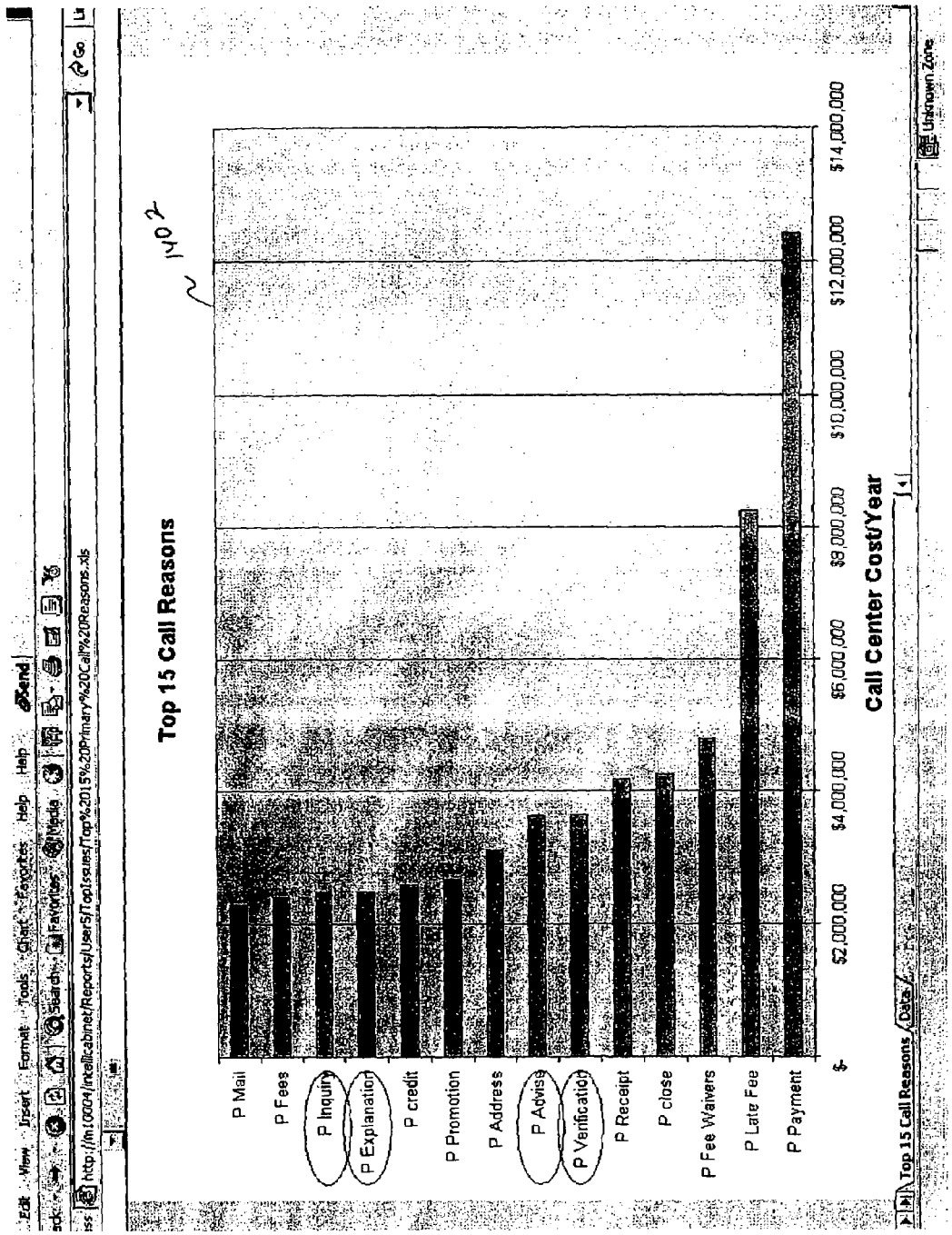

An example of how "p" type concepts are chosen for further analysis is shown in a graph 1402 of FIG. 14. The abscissa is the quantified cost of a call related to the p parent type derived from the analysis. The ordinate is the p parent type representing a ranked list by frequency of occurrence of child concepts for their respective parent concepts with the highest occurrence at the bottom of the graph. A client/domain expert is involved in examining the primary call reasons and their quantified costs. Those reasons unknown to the client/domain expert with high business value (cost) are chosen for further analysis. In this example, "p payment", "p late fee", "p fee waivers", and "p close" were expected to be primary call reasons and as such did not surprise the client/domain expert. However, "p inquiry", "p explanation", "p advise" and "p verification" were not expected, so a further analysis may be desired.

Figure 15:
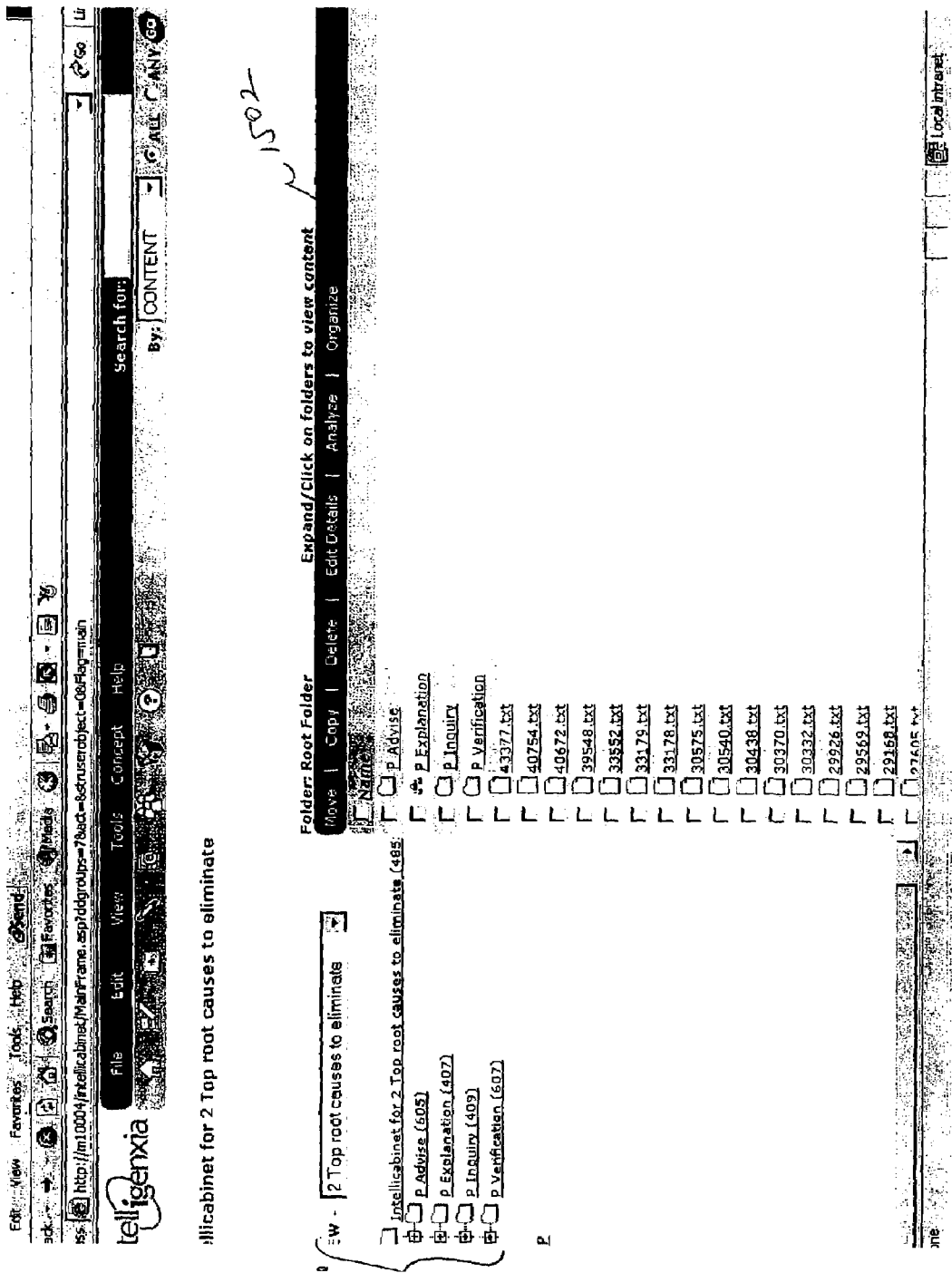

Multi-dimensional analysis may be performed on "p inquiry", "p explanation", "p advise" and "p verification" (Exp-Ver-Inq-Adv analysis), as shown in a menu 1502 of FIG. 15. Merely by way of example, the first step is to create folders using the child concepts for these p parent concepts of menu 1106 (FIG. 11). This example should not unduly limit the scope of the claims herein. One of ordinary skill in the art would recognize many variations, alternatives, and modifications. As another example, folders need not be created but it may be possible to slice and dice across one concept or concept type. The objects are then scored and classified based on the best match using standard natural language processing applications/algorithms shown in menu 1502. Those objects that best matched one p parent concept over another were sorted into their respective folders.

Figure 16:
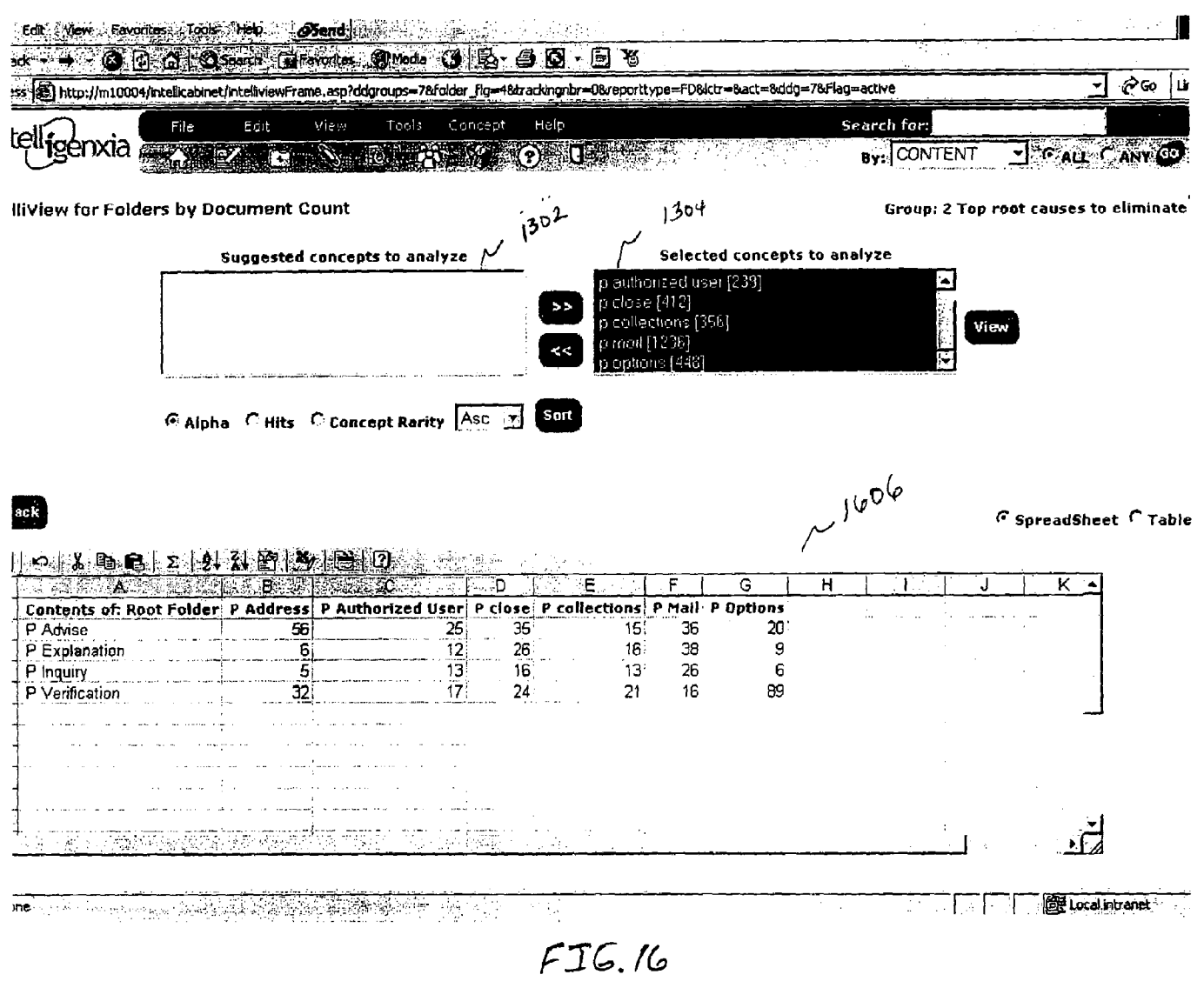
Figure 17:
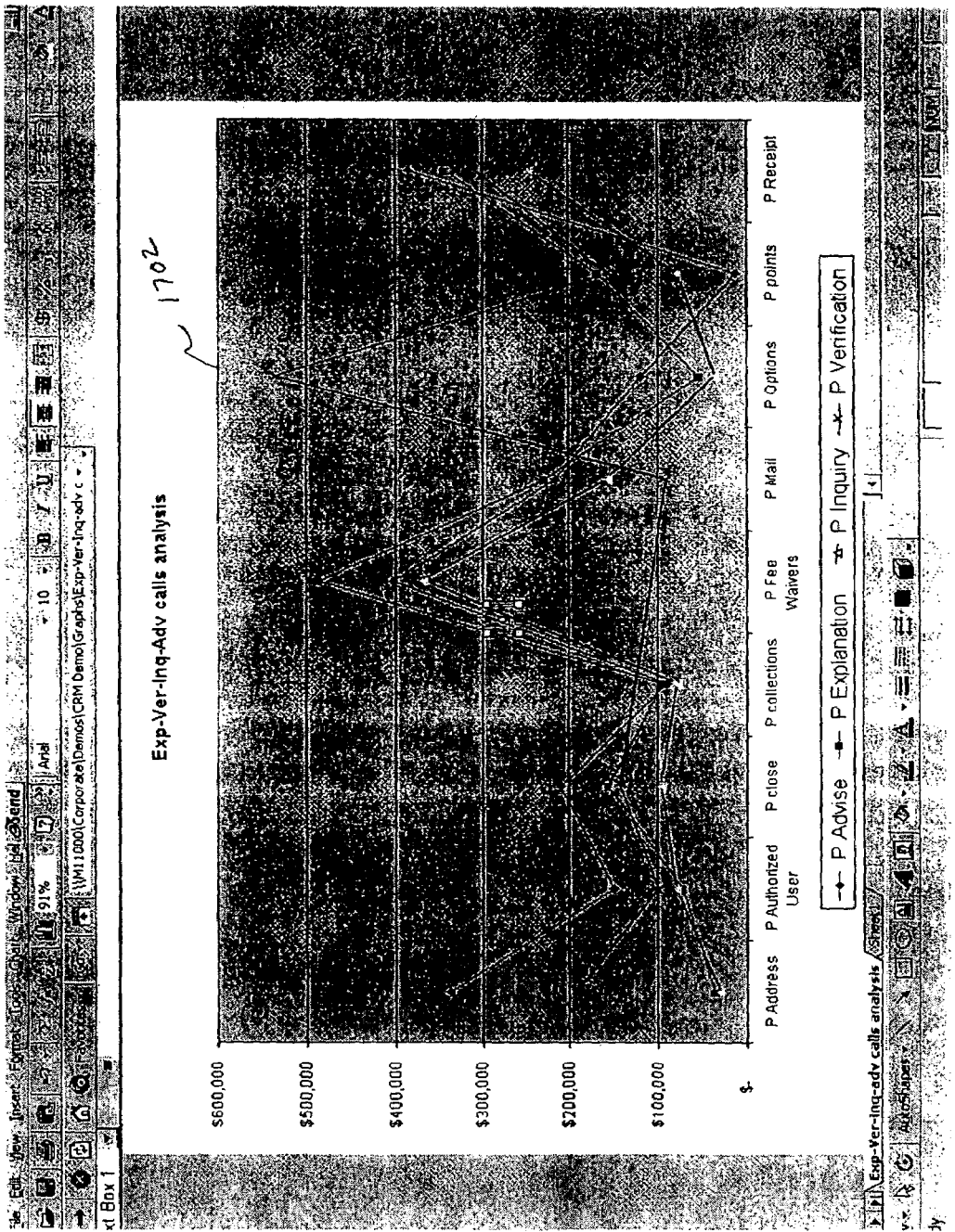

FIG. 16 shows a menu 1606 of a concept matrix of the multi-dimensional analysis used to find relationships among these p parent concepts and other p parent concepts. This Exp-Ver-Inq-Adv analysis across other p parent concepts is also shown in a graph 1702 of FIG. 17, where the abscissa represents the p parent concepts and the ordinate represents the cost.

Figure 18:
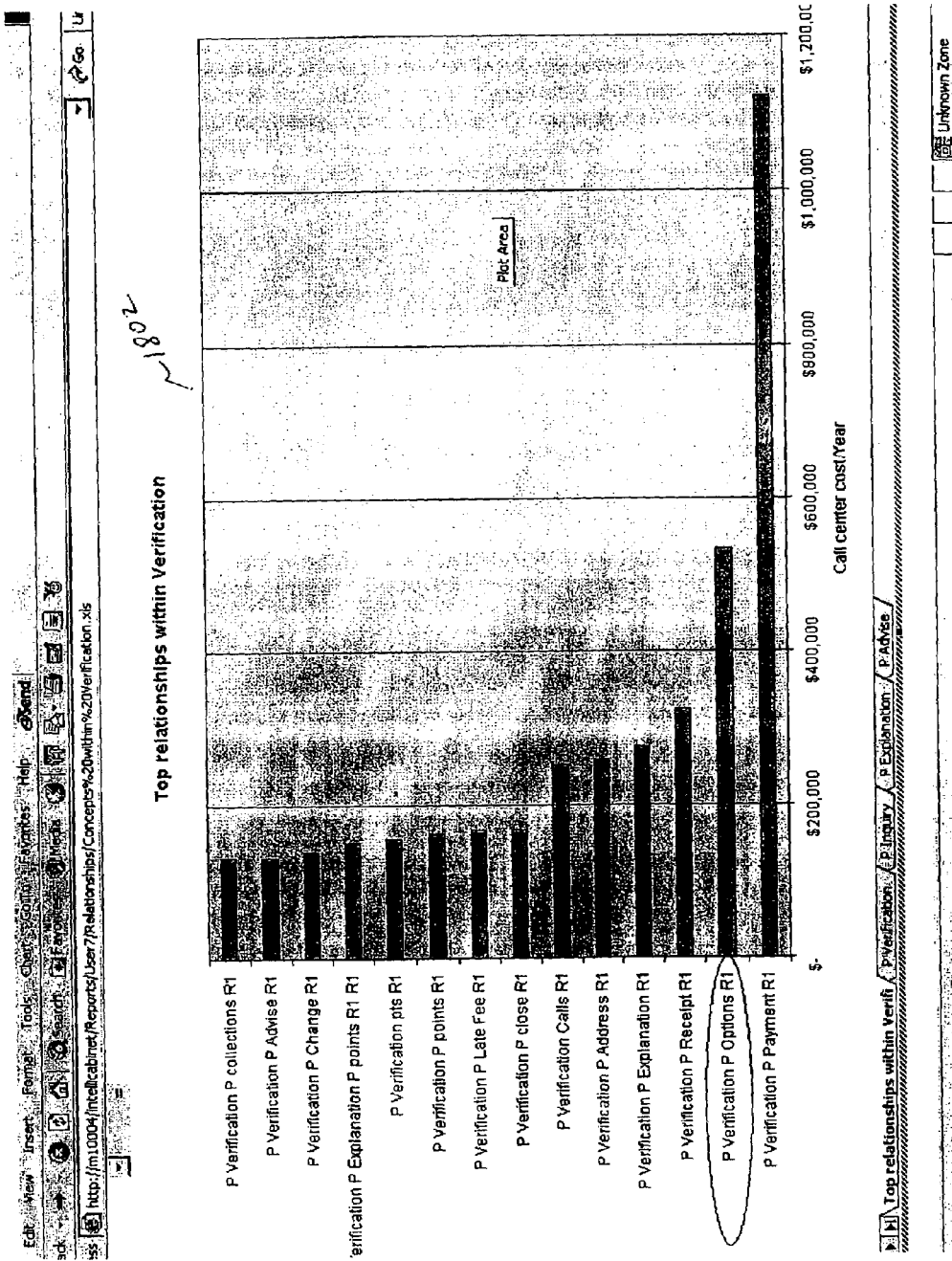

The previous analyses lead to more complex p parent concept combinations as shown in a graph 1802 of FIG. 18. Here, the abscissa is the call center cost per year, while the ordinate represents the combined p parent concepts based on a given relationship. The circled "p verification p options R1" label represents a non-obvious, complex concept with a high cost that makes it a candidate for further analysis.

Figure 19:
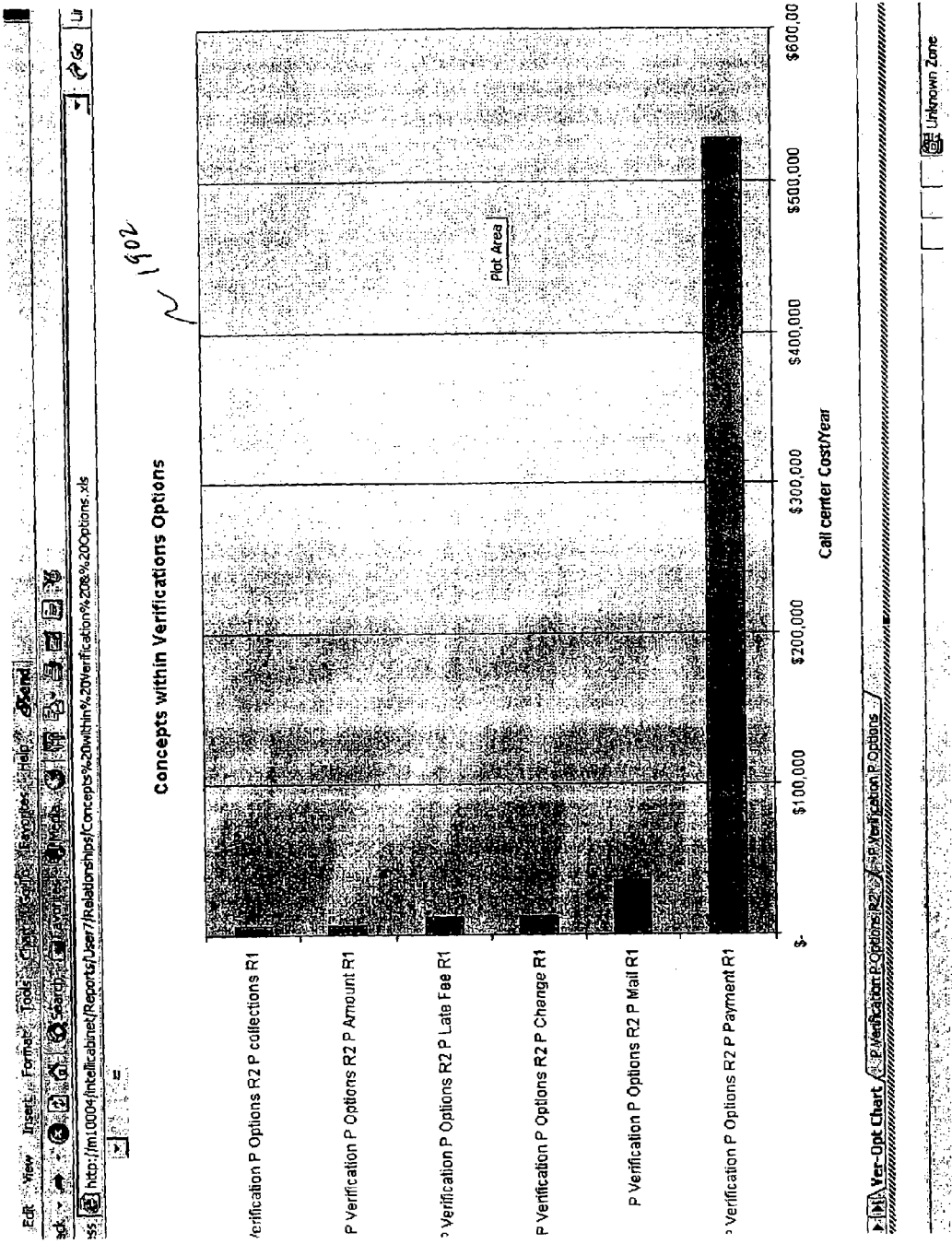

FIG. 19 shows a graph 1902 of a further drill down of the "p verification p options R1" concept from FIG. 18. The abscissa and ordinate are the same as in graph 1802 of FIG. 18. The drill down is further stratified in various categories until all non-obvious complex concepts have been analyzed to the furthest possible drill down level. Graph 1902 shows that the primary reasons for the "p verification p options R1" concept relate predominantly to payment and mail p parent concepts.

Figure 20:
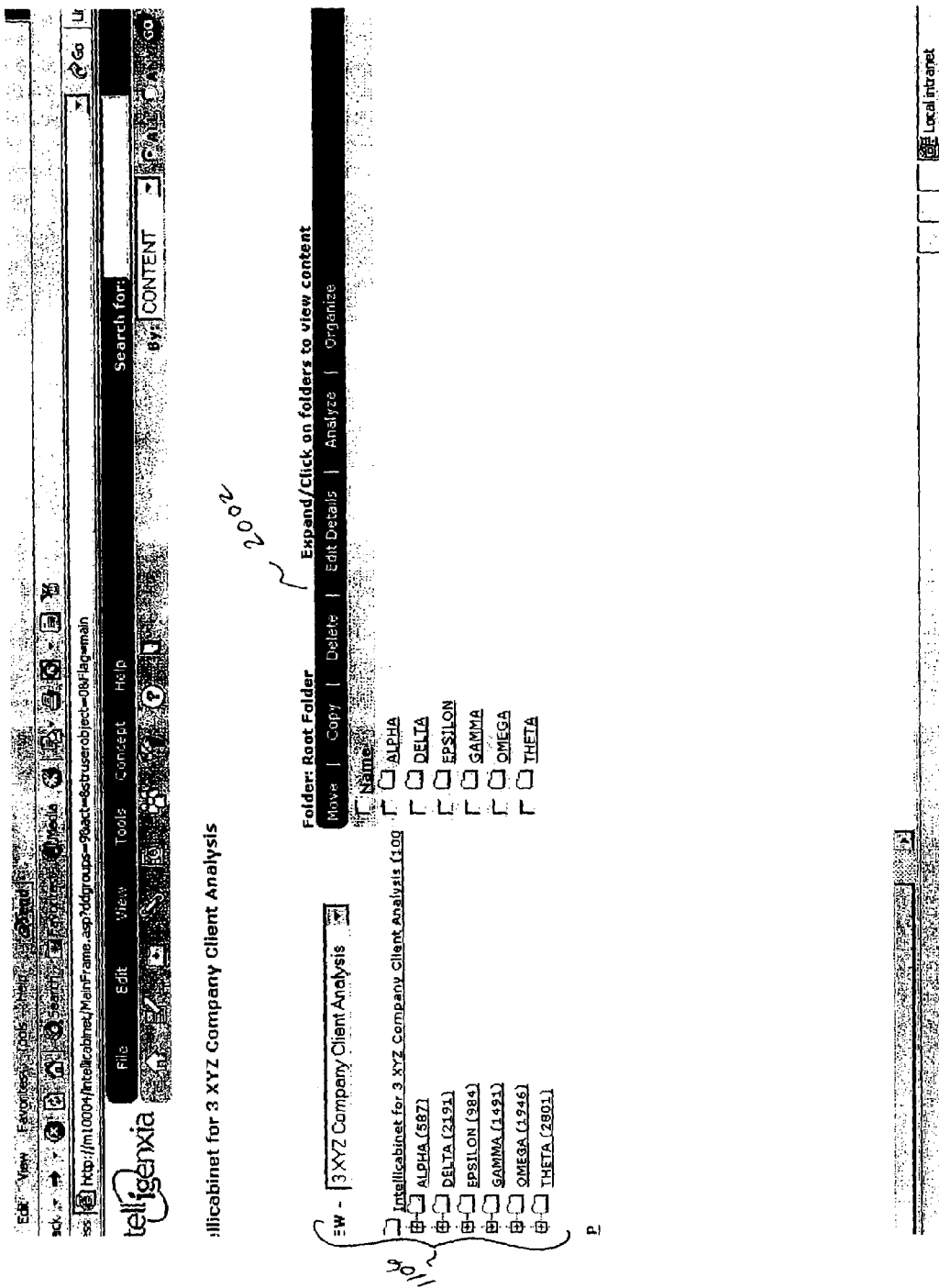

FIG. 20 shows another menu organization 2002 of the objects by clients, where the clients are represented by "Alpha," "Delta," "Epsilon," "Gamma," "Omega," and "Theta." Folders are created to hold concepts related to these clients, as shown in menu 1106 (FIG. 11).

Figure 21:
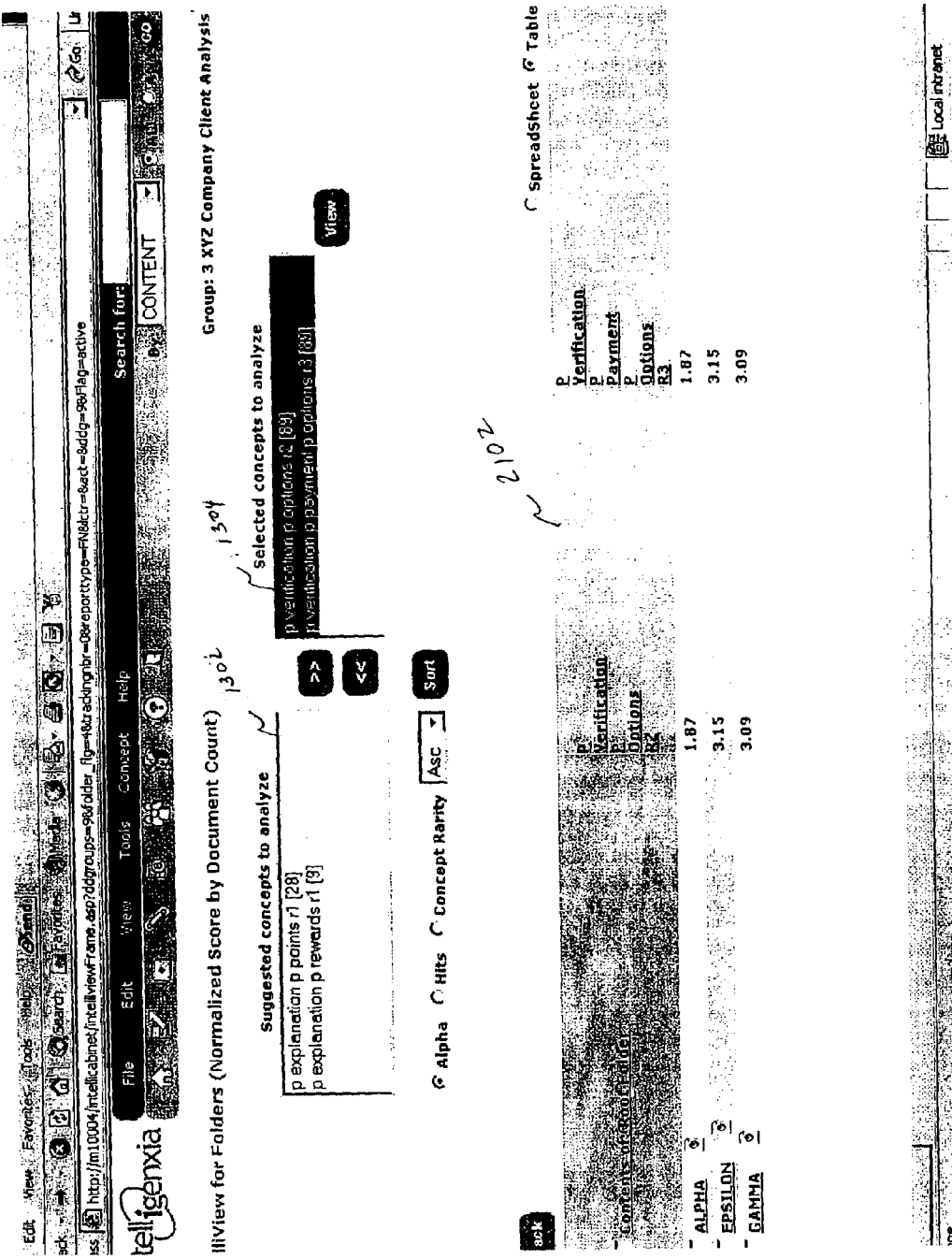

The most interesting concepts may be analyzed on a client-by-client basis by examining their frequency of occurrence. This is illustrated in FIG. 21 by a menu 2102. In menu 2102, the columns hold the complex compound concepts (e.g., "P Verification P Options R2" and "P Verification P Payment P Options R3") with a given relationship, while the rows represent the different clients (e.g., Alpha, Epsilon and Gamma). The scores can be normalized, be represented as a percentage of total calls, or be used with other normalization algorithms.

Figure 22:
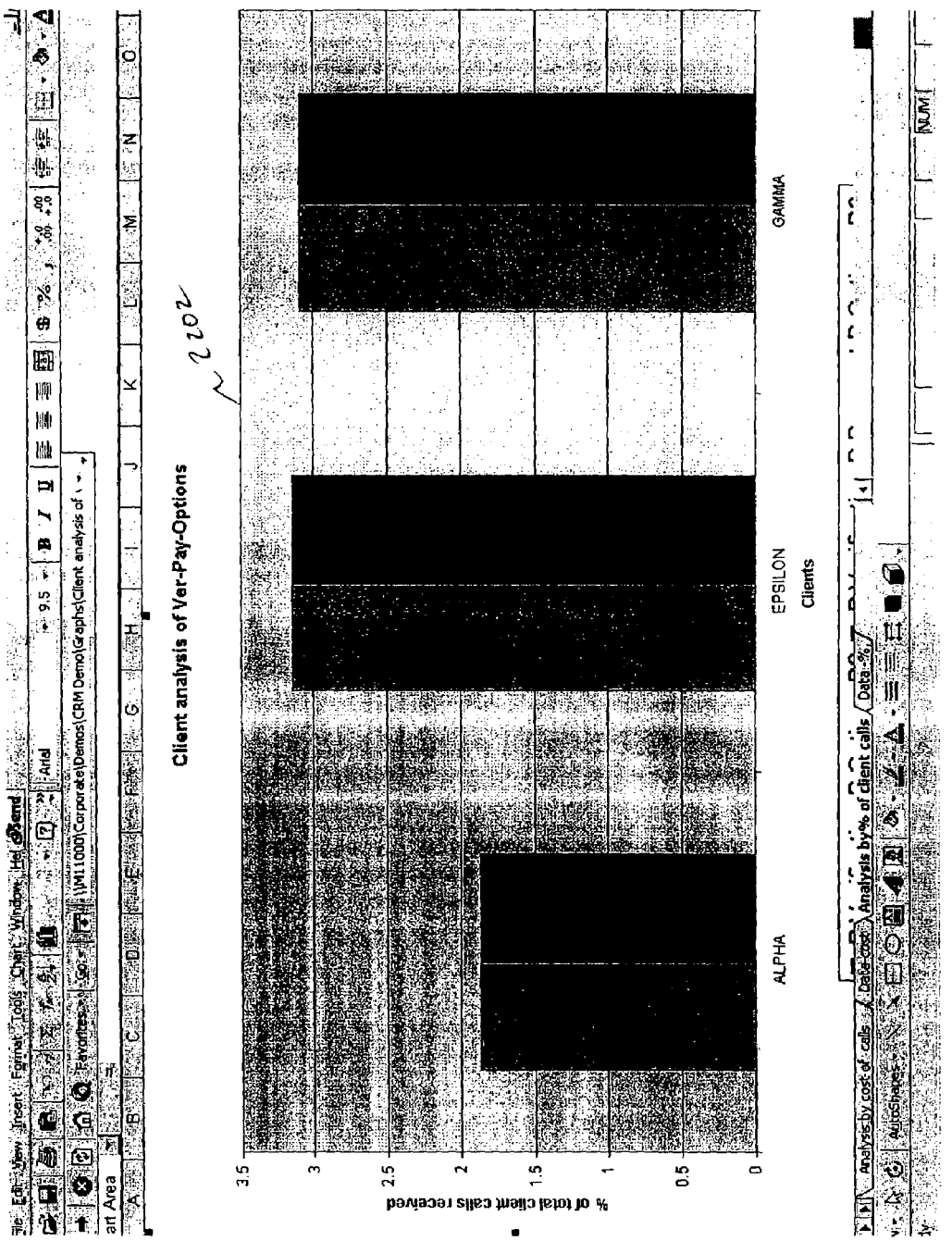

The analysis from FIG. 21 may be visualized as part of a multidimensional analysis as illustrated in a bar graph 2202 in FIG. 22. This graph compares the percent of total client calls received by an individual client (e.g., Alpha, Epsilon, and Gamma) for the complex concept "p verification p payment p options" to the total client calls received by all clients for this concept.

Figure 23:
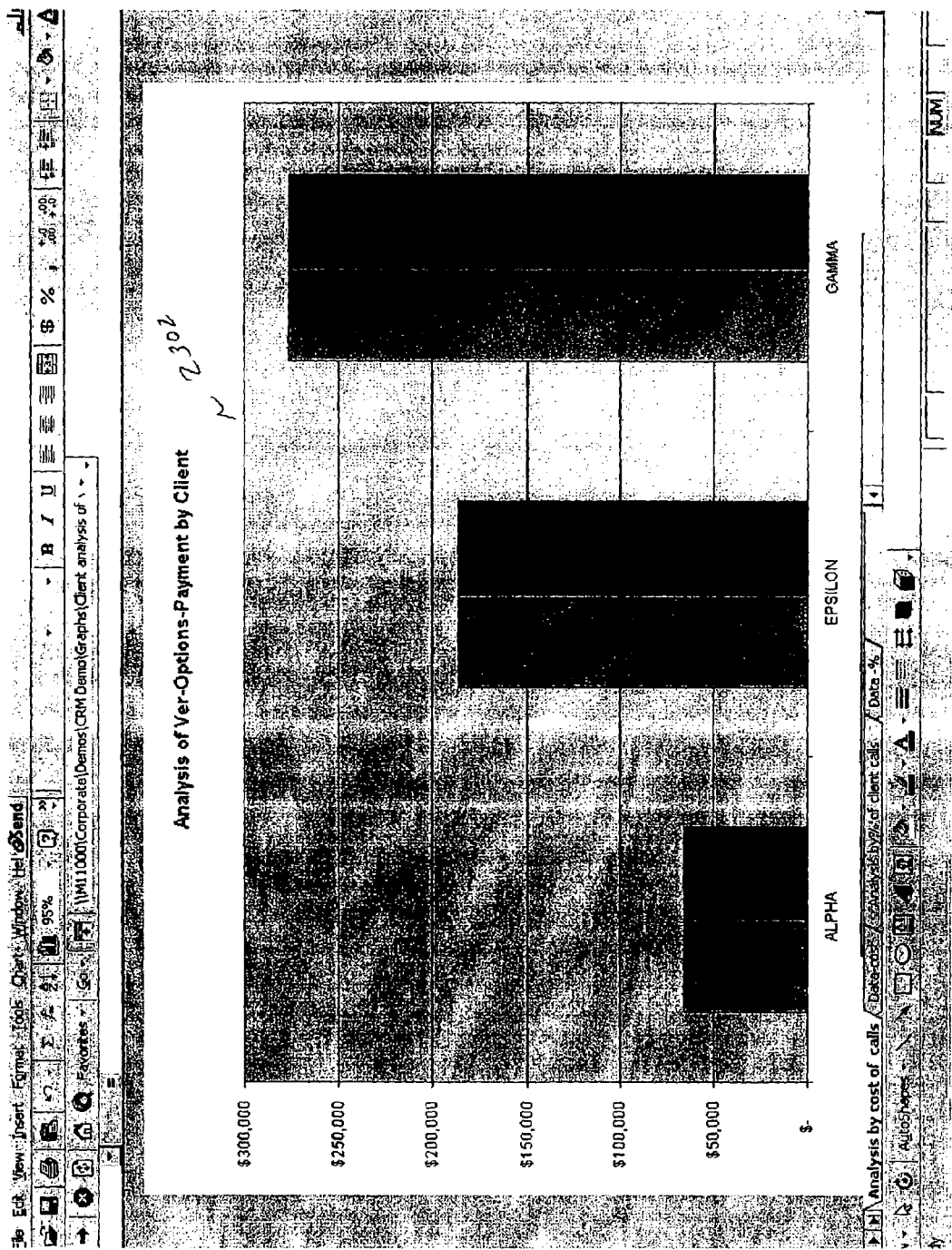

The absolute cost of these calls are shown in graph 2302 of FIG. 23, where these same three clients (i.e., Alpha, Epsilon, and Gamma) are examined with respect to absolute cost on the ordinate for the complex concepts "p verification p payment p options."

IX. CONCLUSION

Embodiments of the method of the present invention can be performed using a computer software system of the type sold by Intelligenxia, Inc. of Jacksonville, Fla. The Intelligenxia system is described, in part, in the above-referenced U.S. patent applications. Modifications and extensions to the Intelligenxia system necessary to implement the present invention will be apparent to a person skilled in the art based on the disclosure set forth herein.

While exemplary embodiments of the present invention have been described above, it should be understood that these embodiments have been presented by way of example only, and are not meant to limit the scope of the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents. Each document cited herein is hereby incorporated by reference in its entirety.

What is claimed is:

1. A computer-readable storage medium storing codes that when executed by a processor perform a method, comprising:
    receiving from a user a selection of a first category and a second category from among a plurality of categories associated with a set of objects, the first category being associated with a first subset of objects from among a plurality of subsets of objects, and the second category being associated with a second subset of objects from among the plurality of subsets of objects, each of the first subset and the second subset being included in the set of objects and including at least one object;
    receiving from a user a selection of a concept from among a plurality of concepts associated with the first category;
    performing multi-dimensional analysis on the concept to determine a presence or absence of the concept in each of the first subset and the second subset;
    for each of the first subset and second subset, if the concept is present in that subset, providing an indication of a strength of presence of the concept in that subset; and
    if the concept is absent from the second subset, providing an indication of an absence of the concept from the second subset, the indication of the absence including a reference to the concept and the second category.

2. The computer-readable storage medium of claim 1, wherein the concept is a first concept, the indication of a strength of presence is a first indication of a strength of presence, and the indication of an absence is a first indication of an absence, further comprising codes that when executed by a processor perform the following steps:
    for each of the first subset of objects and the second subset of objects, determining, based on the multi-dimensional analysis, if a second concept is present in that subset;
    performing multi-dimensional analysis on the second concept to determine a presence or absence of the second concept in each of the first subset and the second subset;
    for each of the first subset and the second subset, if the second concept is present in that subset, providing a second indication of a strength of presence of the second concept in that subset; and
    if the second concept is absent from that subset, providing a second indication of an absence of the second concept from that subset, the second indication of the absence including a reference to the second concept and a category that is associated with that subset.

3. The computer-readable storage medium of claim 2, further comprising codes that when executed by a processor perform the step of:
    creating a business rule to be used in a transformation of data into a datastore.

4. The computer-readable storage medium of claim 1, wherein the concept is a first concept, further comprising codes that when executed by a processor perform the steps of:
    determining, based on the multi-dimensional analysis, that a second concept from among the plurality of concepts should be deleted from the plurality of concepts;
    deleting the second concept from the plurality of concepts;
    determining if there exists a second category to be included in the plurality of categories; and
    if the second category exists, repeating the detecting and deleting.

5. The computer-readable storage medium of claim 1, wherein the set of objects is comprised of at least one of:
    structured data;
    unstructured data; and
    semi-structured data.

6. The computer-readable storage medium of claim 1, wherein the user selection of the first category is based on one or more of:
    a location of the first subset of objects on a computer disk drive, a LAN, or a WAN;
    a location of the first subset of objects within a database;
    a URL address of the first subset of objects;
    a presence of a predefined concept, keyword, or text in the first subset of objects; and
    an absence of a predefined concept, keyword, or text in the first subset of objects.

7. The computer-readable storage medium of claim 1, wherein the first subset of objects comprises an electronic file.

8. The computer-readable storage medium of claim 7, wherein the electronic file is selected from the group consisting of a Program File (*.exe), Text File (*.txt, *.prn, *.csv), Word Document (*.doc), Rich Text Format (*.rtf), Windows Write (*.wri), Word for Macintosh (*.mcw), MS-DOS Text with Layout (*.asc), Text with Layout (*.ans), E-mails (*.eml), Outlook Address Book (*.olk), Personal Address Book (*.pab), WordPerfect file (*.wpd), Schedule+Contact (*.scd), Powerpoint (*.ppt), Harvard Graphics Show (*.sh3), Harvard Graphics Chart (*.ch3), Freelance Windows file (*.pre), Excel File (*.xl*), Adobe Acrobat File (*.pdf), Web Page (*.htm*, *.asp, *.jsp), Query File (*.*qy), Lotus 1-2-3 File (*.wk*), Quattro Pro/Dos File (*.wq1), Microsoft Works File (*.wks), Works for Window (*.wps), Microsoft Access Files (*.mdb), Dbase Files (*.dbf), SYLK Files (*.slk), Data Interchange Format File (*.dif), Backup File (*.bak), Quattro Pro 1.0/5.0 (win) (*.wbl), Text Recovered from any File (*.*), Graphic Interchange Format (*.gif), Windows Bitmap (*.bmp), JPEG file interchange format (*.jpg), Tag image file format (*.tif), portable network graphics (*.png), Kodac Photo CD (*.pcd), PC Paintbrush (*.pcx), Raster file (*.ras), Audio File (*.wav, *.snd, *.aif, *.aifc, *.aiff, *.wma, *.mp3), CD Audio Track (*.cda), Media Playlist (*.asx, *.wax, *.m3u, *.wvx), MIDI File (*.mid, *.rmi, *.midi), Movie File (*.mpeg, *.mpg, *.m1v, *.mp2, *.mpa, *.mpe), Video File (*.avi, *.wmv), Windows Media File (*.asf, *.wm, *.wma, *.wmv), and Tactile Sensing File in ASCII, LabView, or MATLAB formats.

9. The computer-readable storage medium of claim 1, further comprising codes that when executed by a processor perform the steps of:
    extracting the concept from the set of objects, the extracting including one or more of:
        generating a common format of the set of objects using an application programming interface (API);
        generating a common format of the set of objects using an extraction algorithm;

determining an image intensity of the set of objects;
determining at least one boundary within the set of objects;
mapping audio waveforms within the set of objects to a text format; and
converting non-textual information within the set of objects into text.

10. The computer-readable storage medium of claim 1, wherein the set of objects is a first set of objects, and the performing multi-dimensional analysis includes one or more of:
    determining a number of objects within the first subset of objects;
        determining a frequency of occurrence of the concept within the first set of objects;
        determining a frequency of occurrence of the concept within the first subset of objects;
        determining a frequency of occurrence of the concept within a second set of objects different from the first set of objects;
        determining a normalized frequency of occurrence of the concept within the first set of objects;
        determining a normalized frequency of occurrence of the concept within the first subset of objects;
        determining a normalized frequency of occurrence of the concept within the second set of objects;
    determining an electronic path to the location of the first subset of objects;
    determining a characteristic of the first subset of objects;
    determining a concept type for the concept;
    determining a definition for the first concept; and
    if the first subset of objects contains the concept, determining a position of the concept within the first subset.

11. The computer-readable storage medium of claim 10, wherein the characteristic is one of:
    a file extension
    a creation date; and
    an effective date and a status.

12. The computer-readable storage medium of claim 10, wherein the concept type is a P parent type.

13. The computer-readable storage medium of claim 10, wherein the performing multi-dimensional analysis includes slicing-and-dicing across at least one dimension of the set of objects.

14. The computer-readable storage medium of claim 13, wherein the at least one dimension is one of:
    a time dimension, a geographical location dimension, an electronic location dimension, a person dimension, a multiple-person dimension, a business unit dimension, an organization dimension, a process dimension, a product dimension, a service dimension, a subject dimension, a category dimension, a concept dimension, a concept type dimension, a user viewpoint dimension, and an entity dimension in a structured database.

15. The computer-readable storage medium of claim 1, wherein the performing multi-dimensional analysis further comprises codes that when executed by a processor perform at least one of the following:
    generating a report based on the analysis; and
    displaying results of the analysis in one or more of:
        a graphical format; and
        a visual format.

16. The computer-readable storage medium of claim 1, further comprising codes that when executed by a processor perform the following step:
    using the multi-dimensional analysis to discover a result, the result being one of:
        a trend of concepts within the set of objects;
        a pattern of concepts within the set of objects;
        a concept exception within the set of objects; and
        at least one relationship between concepts within the set of objects.

17. The computer-readable storage medium of claim 1, wherein the method further comprises codes that when executed by a processor perform at least one of:
    storing the concept in a concept repository; and
    sharing the concept with one or more other users.

18. The computer-readable storage medium of claim 1, wherein the using a processor to perform multi-dimensional analysis includes creating a hierarchy of the plurality of concepts based on user input.

19. The computer-readable storage medium of claim 1, wherein the concept is a first concept, further comprising codes that when executed by a processor perform the step of:
    refining the concept based on a relationship to a second concept before performing the multi-dimensional analysis.

20. The computer-readable storage medium of claim 19, wherein the second concept is not within the set of objects.

21. The computer-readable storage medium of claim 19, wherein the concept is a first concept, the set of objects is a first set of objects, and the refining the first concept includes one or more of:
    determining a relationship of the first concept to a second concept within an existing reference;
    determining a relationship of the first concept to a second concept using a natural language processing (NLP) algorithm;
    determining a frequency of occurrence of the first concept within the first set of objects;
    determining a frequency of occurrence of the first concept within a second set of objects different from the first;
    determining a normalized frequency of occurrence of the first concept within the first set of objects; and
    determining a normalized frequency of occurrence of the first concept within the second set of objects.

22. The computer-readable storage medium of claim 1, further comprising codes that when executed by a processor perform the steps of:
    receiving from a user a selection of a first subcategory and a second subcategory from among a plurality of subcategories associated with the first subset of objects, the first subcategory being associated with a first sub-subset of the first subset and the second subcategory being associated with a second sub-subset of the first subset, each of the first and second sub-subset including one or more objects;
    performing multi-dimensional analysis on the concept to determine a presence or absence of the concept in each of the first sub-subset and the second sub-subset;
    for each of the first sub-subset and the second sub-subset, if the concept is present in that sub-subset, providing an indication of a strength of presence of the concept in that sub-subset; and
    if the concept is absent from that sub-subset, providing an indication of an absence of the concept from that sub-subset, the indication of the absence including a reference to the concept and the subcategory that is associated with that subset.

23. The computer-readable storage medium of claim 1, further comprising codes that when executed by a processor perform the steps of:
    receiving from a user a selection of a subconcept from a plurality of subconcepts associated with the concept;

performing multi-dimensional analysis on the subconcept to determine a presence or absence of the subconcept in each of the first subset and second subset;

for each of the first subset and the second subset, if the subconcept is present that subset, providing an indication of a strength of presence of the subconcept in that subset; and if the subconcept is not present in the second subset, providing an indication of an absence of the subconcept from the second subset, the indication of the absence including a reference to the subconcept and the second category.

24. The computer-readable storage medium of claim 1, further comprising codes that when executed by a processor perform the steps of:

receiving from a user a selection of a subconcept from a plurality of subconcepts associated with the concept;

receiving from a user a selection of a first subcategory and a second subcategory from among a plurality of subcategories associated with the first subset of objects, the first subcategory being associated with a first sub-subset of the first subset and the second subcategory being associated with a second sub-subset of the first subset, each of the first and second sub-subset including one or more objects;

performing multi-dimensional analysis on the subconcept to determine a presence or absence of the subconcept in each of the first sub-subset and the second sub-subset;

for each of the first sub-subset and the second sub-subset, if the subconcept is present in that sub-subset, providing an indication of a strength of presence of the subconcept in that sub-subset; and if the subconcept is absent from that sub-subset, providing an indication of an absence of the subconcept from that sub-subset, the indication of the absence including a reference to the subconcept and the subcategory associated with that subset.

25. A method, comprising:

receiving one or more signals that define a plurality of categories associated with a set of data objects;

receiving a selection of a category from among the plurality of categories, the category being associated with a subset of objects, the subset being included in the set of objects and including at least one object;

receiving a selection of a concept from among a plurality of concepts associated with the category;

using a processor to perform multi-dimensional analysis on the concept, the multi-dimensional analysis including determining a strength of presence of the concept in the subset;

if the concept is absent from the subset, providing an indication of an absence of the concept from the subset; and outputting to a display device a graphical representation of the strength of presence and the category.

26. The method of claim 25, wherein the using a processor to perform multi-dimensional analysis includes one or more of:

determining a frequency of occurrence of the concept within the set of objects;

determining a normalized frequency of occurrence of the concept within the set of objects;

determining a normalized frequency of occurrence of the concept within the subset of objects;

determining an electronic path to the location of the subset of objects;

determining a characteristic of the subset of objects; and determining a concept type for the concept.

27. The method of claim 25, wherein the first subset is selected by a user, the selection being based on one or more of:

a location of the subset on a computer disk drive, a LAN, or a WAN;

a location of the subset within a database;

a URL address of the subset;

a presence of a predefined concept, keyword, or text in the subset; and an absence of a predefined concept, keyword, or text in the subset.

28. The method of claim 25, wherein the using a processor to perform multi-dimensional analysis includes slicing-and-dicing across at least one dimension of the set of data objects.

29. The method of claim 25, wherein the concept is detected in the set of data objects, further comprising:

generating a common format of the set of data objects using an application programming interface (API);

generating a common format of the set of data objects using an extraction algorithm;

determining an image intensity of the set of data objects;

determining at least one boundary within the set of data objects;

mapping audio waveforms within the set of data objects to a text format; and converting non-textual information within the set of data objects into text.

30. The method of claim 25, wherein the using a processor to perform multi-dimensional analysis includes creating a hierarchy of a plurality of concepts based on user input, the plurality of concepts including the concept.

31. The method of claim 25, wherein the concept is a first concept, further comprising:

refining the first concept based on a relationship to a second concept before using a processor to perform the multi-dimensional analysis.

32. The method of claim 31, wherein the set of data objects is a first set of data objects, and the second concept is present in a second set of data objects different from the first set of data objects.

33. The method of claim 31, wherein the concept is a first concept, the set of objects is a first set of data objects, and the refining the first concept includes one or more of:

determining a relationship of the first concept to a second concept within an existing reference;

determining a relationship of the first concept to a second concept using a natural language processing (NLP) algorithm;

determining a frequency of occurrence of the first concept within the first set of data objects;

determining a frequency of occurrence of the first concept within a second set of data objects different from the first;

determining a normalized frequency of occurrence of the first concept within the first set of data objects; and determining a normalized frequency of occurrence of the first concept within the second set of data objects.

34. The method of claim 25, wherein the step of using a processor to perform multi-dimensional analysis further comprises at least one of the following steps:

generating reports based on the analysis; and displaying results of the analysis in a visual format.

* * * * *

UNITED STATES PATENT AND TRADEMARK OFFICE
CERTIFICATE OF CORRECTION

| | | |
|---|---|---|
| PATENT NO. | : 7,627,588 B1 | Page 1 of 1 |
| APPLICATION NO. | : 10/677492 | |
| DATED | : December 1, 2009 | |
| INVENTOR(S) | : Rengaswamy Mohan | |

It is certified that error appears in the above-identified patent and that said Letters Patent is hereby corrected as shown below:

Col. 22, lines 3-13; should read;

-- 27. The method of claim 25, wherein the subset is selected by a user, the selection being based on one or more of:

a location of the subset on a computer disk drive, a LAN, or a WAN;

a location of the subset within a database;

a URL address of the subset;

a presence of a predefined concept, keyword, or text in the subset; and an absence of a predefined concept, keyword, or text in the subset. --

Signed and Sealed this

Ninth Day of February, 2010

David J. Kappos
*Director of the United States Patent and Trademark Office*